United States Patent
Lee et al.

(10) Patent No.: US 9,386,295 B2
(45) Date of Patent: Jul. 5, 2016

(54) DIGITAL RECEIVER AND METHOD FOR PROCESSING 3D CONTENT IN THE DIGITAL RECEIVER

(75) Inventors: Joonhui Lee, Seoul (KR); Jeehyun Choe, Seoul (KR); Jongyeul Suh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 444 days.

(21) Appl. No.: 13/819,958

(22) PCT Filed: Sep. 1, 2011

(86) PCT No.: PCT/KR2011/006494
§ 371 (c)(1),
(2), (4) Date: Feb. 28, 2013

(87) PCT Pub. No.: WO2012/030177
PCT Pub. Date: Mar. 8, 2012

(65) Prior Publication Data
US 2013/0155186 A1    Jun. 20, 2013

Related U.S. Application Data

(60) Provisional application No. 61/379,374, filed on Sep. 1, 2010.

(51) Int. Cl.
*H04N 15/00* (2006.01)
*H04N 13/00* (2006.01)
(Continued)

(52) U.S. Cl.
CPC ....... *H04N 13/0059* (2013.01); *H04N 13/0048* (2013.01); *H04N 13/0055* (2013.01);
(Continued)

(58) Field of Classification Search
USPC .......................................................... 348/43
See application file for complete search history.

(56) References Cited

U.S. PATENT DOCUMENTS

| 5,900,916 A * | 5/1999 | Pauley ............................ 725/59 |
| 2003/0048383 A1* | 3/2003 | Casteleyn et al. ............. 348/565 |

(Continued)

FOREIGN PATENT DOCUMENTS

| CA | 2748510 A1 | 7/2010 |
| CN | 1774937 A | 5/2006 |

(Continued)

OTHER PUBLICATIONS

Hyun Lee et al: "A Structure for 2D/3D Mixed Service Based on Terrestrial DMB System", 3DTV Conference, 2007, IEEE, PI, May 1, 2007, pp. 1-4, XP031158177, ISBN:978-1-4244-0721-7 *figure 7*.

(Continued)

*Primary Examiner* — Leron Beck
(74) *Attorney, Agent, or Firm* — Dentons US LLP

(57) ABSTRACT

A digital receiver that processes 3D video data having a receiving unit for receiving a first broadcast signal, including a first 3D service and first signaling data for the first 3D service, via a first channel, and a second broadcast signal, including a second 3D service related to the first 3D service and second signaling data for the second 3D service, via a second channel. The digital receiver further having a demultiplexer for demultiplexing 3D service data and signaling data from the first broadcast signal and second broadcast signal, respectively, a control unit for acquiring information on the channel for receiving the second broadcast signal on the basis of the demultiplexed first signaling data, a decoder for decoding each datum of the 3D service data, and a formatter for formatting each datum of the decoded 3D service data in accordance with an output format of the display screen.

10 Claims, 42 Drawing Sheets

(51) Int. Cl.
*H04N 21/434* (2011.01)
*H04N 21/462* (2011.01)
*H04N 21/81* (2011.01)
*H04N 13/04* (2006.01)

(52) U.S. Cl.
CPC ....... *H04N13/0066* (2013.01); *H04N 21/4345* (2013.01); *H04N 21/4622* (2013.01); *H04N 13/0445* (2013.01); *H04N 21/816* (2013.01)

(56) References Cited

U.S. PATENT DOCUMENTS

| | | | | |
|---|---|---|---|---|
| 2008/0310499 | A1* | 12/2008 | Kim et al. | 375/240.01 |
| 2009/0141024 | A1* | 6/2009 | Lee et al. | 345/420 |
| 2010/0157025 | A1* | 6/2010 | Suh et al. | 348/51 |
| 2011/0119708 | A1* | 5/2011 | Lee et al. | 725/39 |
| 2011/0149040 | A1* | 6/2011 | Klebanov et al. | 348/46 |

FOREIGN PATENT DOCUMENTS

| | | |
|---|---|---|
| KR | 10-2011-0052306 A | 5/2011 |
| KR | 10-2011-0058035 A | 6/2011 |
| KR | 10-2011-0076324 A | 7/2011 |
| WO | 2010073870 A1 | 7/2010 |
| WO | 2010087575 A2 | 8/2010 |

OTHER PUBLICATIONS

Anonymous: "White paper Blu-ray Disc Format: 2.B Audio Visual Application Format Specifications for BD-ROM Version 2.4", Apr. 30, 2010, XP055007518, Retrieved from the Internet: URL:http://www.blu-raydisc.com/assets/Downloadablefile/BD-ROM-AV-WhitePaper_100423-17830.pdf [retrieved on Sep. 19, 2011] *p. 38-p. 45*.

* cited by examiner

FIG. 4

| Syntax | No. of bits | Format |
|---|---|---|
| terrestrial_virtual_channel_table_section () { | | |
|   table_id | 8 | 0xC8 |
|   section_syntax_indicator | 1 | '1' |
|   private_indicator | 1 | '1' |
|   reserved | 2 | '11' |
|   section_length | 12 | uimsbf |
|   transport_stream_id | 16 | uimsbf |
|   reserved | 2 | '11' |
|   version_number | 5 | uimsbf |
|   current_next_indicator | 1 | bslbf |
|   section_number | 8 | uimsbf |
|   last_section_number | 8 | uimsbf |
|   protocol_version | 8 | uimsbf |
|   num_chnnels_in_section | 8 | uimsbf |
|   for (i=0; i<num_channels_insection; i++) { | | |
|     short_name | 7*16 | uimsbf |
|     reserved | 4 | '1111' |
|     major_channel_number | 10 | uimsbf |
|     minor_channel_number | 10 | uimsbf |
|     modulation_mode | 8 | uimsbf |
|     carrier_frequnecy | 32 | uimsbf |
|     channel_TSID | 16 | uimsbf |
|     program_number | 16 | uimsbf |
|     ETM_location | 2 | uimsbf |
|     access_controlled | 1 | bslbf |
|     hidden | 1 | bslbf |
|     reserved | 2 | '11' |
|     hide_guide | 1 | bslbf |
|     reserved | 3 | '111' |
|     service_type | 6 | uimsbf |
|     source_id | 16 | uimsbf |
|     reserved | 6 | '111111' |
|     descriptors_length | 10 | uimsbf |
|     for (i=0; i<N; i++) { | | |
|       descriptor() | | |
|     } | | |
|   } | | |
|   reserved | 6 | '111111' |
|   additional_descriptor_length | 10 | uimsbf |
|   for (i=0; i<N; i++) { | | |
|     additional_descriptor() | | |
|   } | | |
|   CRC_32 | 32 | rpchof |
| } | | |

FIG. 5

| service_type | Meaning |
|---|---|
| 0x00 | [Reserved] |
| 0x01 | Analog Television |
| 0x02 | ATSC Digital Television |
| 0x03 | ATSC Audio |
| 0x04 | ATSC Data Only Service |
| 0x05 | ATSC Software Download Service |
| 0x06-0x12 | Reserved |
| 0x13 | ATSC 3D service |
| 0x14 | ATSC 3D PIP service – The virtual channel carries 3D PIP television programming (audio, video, and associated 3D metadata) |

FIG. 6

| Syntax | No. of bits | Format |
|---|---|---|
| extended_service_descriptor ( ) { | | |
|     descriptor_tag | 8 | 0xTBD |
|     descriptor_length | 8 | uimsbf |
|     number_extended_channels | 8 | uimsbf |
|     for (j=0; j < number_extended_elements; j++) { | | |
|         extended_service_type | 8 | uimsbf |
|         reserved | 4 | '1111' |
|         ext_major_channel_number | 10 | uimsbf |
|         ext_minor_channel_number | 10 | uimsbf |
|         ext_source_id | 16 | uimsbf |
|         ext_channel_TSID | 16 | uimsbf |
|         ext_program_number | 16 | uimsbf |
|     } | | |
| } | | |

FIG. 7

| extended_service_type | Type of service |
|---|---|
| 0x00 | 3D |
| 0x01 | 3D PIP |
| 0x02 | 3D Preview |

FIG. 8

| Syntax | No. of bits | Format |
|---|---|---|
| service_linkage_descriptor ( ) { | | |
|    descriptor_tag | 8 | 0xTBD |
|    descriptor_length | 8 | uimsbf |
|    number_linked_channels | 8 | uimsbf |
|    for (j=0; j < number_linked_elements; j++) { | | |
|       linked_service_type | 8 | uimsbf |
|       reserved | 4 | '1111' |
|       linked_major_channel_number | 10 | uimsbf |
|       linked_minor_channel_number | 10 | uimsbf |
|       linked_source_id | 16 | uimsbf |
|       linked_channel_TSID | 16 | uimsbf |
|       linked_program_number | 16 | uimsbf |
|    } | | |
| } | | |

FIG. 9

| linked_service_type | Type of service |
|---|---|
| 0x00 | 2D |
| 0x01 | 2D PIP |
| 0x02 | 3D |
| 0x03 | 3D PIP |
| 0x04 | 3D Preview |

FIG. 10

| Syntax | No. of bits | Format |
|---|---|---|
| base_service_descriptor ( ) { | | |
| descriptor_tag | 8 | 0xTBD |
| descriptor_length | 8 | uimsbf |
| reserved | 4 | '1111' |
| base_major_channel_number | 10 | uimsbf |
| base_minor_channel_number | 10 | uimsbf |
| base_source_id | 16 | uimsbf |
| base_channel_TSID | 16 | uimsbf |
| base_program_number | 16 | uimsbf |
| } | | |

FIG. 12

| Syntax | No. of bits | Format |
|---|---|---|
| 3D_PIP_display_option_descriptor ( ) { | | |
| descriptor_tag | 8 | 0xTBD |
| descriptor_length | 8 | uimsbf |
| reserved | 2 | '11' |
| PIP_offset_depth | 11 | uimsbf |
| PIP_boundary_offset_depth | 11 | uimsbf |
| PIP_boundary_thickness | 8 | uimsbf |
| } | | |

FIG. 13

| Syntax | No. of bits | Format |
|---|---|---|
| 3D_PIP_implementation_descriptor ( ) { | | |
|   descriptor_tag | 8 | 0xTBD |
|   descriptor_length | 8 | uimsbf |
|   reserved | | |
|   num_of_recommended_modes | 4 | uimsbf |
|   for(j=0; j< num_of_recommended_modes; j++){ | | |
|     priority_id | 4 | uimsbf |
|     reserved | 3 | '111' |
|     PIP_size_type | 1 | uimsbf |
|     if(PIP_size_type==0){ | | |
|       reserved | 2 | '11' |
|       PIP_width | 11 | uimsbf |
|       PIP_height | 11 | uimsbf |
|     } | | |
|     else if(PIP_size_type==1){ | | |
|       reserved | 2 | '11' |
|       PIP_resolution_mode | 6 | uimsbf |
|     } | | |
|     reserved | 7 | '1111111' |
|     PIP_depth_symmetric | 1 | uimsbf |
|     if(PIP_depth_symmetric==0){ | | |
|       reserved | 2 | '11' |
|       PIP_depth_min | 11 | tcimsbf |
|       PIP_depth_max | 11 | tcimsbf |
|     } | | |
|     else if(PIP_depth_symmetric==1){ | | |
|       reserved | 5 | '11111' |
|       PIP_detph_range | 11 | uimsbf |
|     } | | |
|   } | | |
| } | | |

FIG. 14

| PIP_resolution_mode | PIP resolution [pixel x pixel] |
|---|---|
| 0x00 | 360x240 |
| 0x01 | 240x160 |
| 0x02 | 180x120 |
| 0x03 | 120x80 |

FIG. 18

| PIP resolution size [pixel x pixel] | PIP depth range (symmetric) | PIP depth range (non-symmetric) |
|---|---|---|
| 360 x 240 | -30 ~ +30 | -10 ~ +50 |
| 240 x 160 | -23 ~ +23 | -7 ~ +45 |
| 180 x 120 | -15 ~ +15 | -4 ~ +40 |
| 150 x 100 | -13 ~ +13 | -1 ~ +35 |
| 120 x 80 | -12 ~ +12 | +2 ~ +30 |
| PIP_width x PIP_height | PIP depth min ~ PIP depth max | PIP depth min ~ PIP depth max |

FIG. 19

| Syntax | No. of bits | Mnemonic |
|---|---|---|
| service_description_section ( ) { | | |
|    table_id | 8 | uimsbf |
|    section_syntax_indicator | 1 | bslbf |
|    reserved_future_use | 1 | bslbf |
|    reserved | 2 | bslbf |
|    section_length | 12 | uimsbf |
|    transport_stream_id | 16 | uimsbf |
|    reserved | 2 | bslbf |
|    version_number | 5 | uimsbf |
|    current_next_indicator | 1 | bslbf |
|    section_number | 8 | uimsbf |
|    last_section_number | 8 | uimsbf |
|    original_network_id | 16 | uimsbf |
|    reserved_future_use | 8 | bslbf |
|    for (i = 0; i < N; i++) { | | |
|      service_id | 16 | uimsbf |
|      reserved_future_use | 6 | bslbf |
|      EIT_schedule_flag | 1 | bslbf |
|      EIT_present_following_flag | 1 | bslbf |
|      running_status | 3 | uimsbf |
|      free_CA_mode | 1 | bslbf |
|      descriptors_loop_length | 12 | uimsbf |
|      for (j = 0; j < N; j++) { | | |
|        descriptor ( ) | | |
|      } | | |
|    } | | |
|    CRC_32 | 32 | rpchof |
| } | | |

FIG. 20

| service_type | Description |
|---|---|
| 0X00 | reserved for future use |
| 0X01 | digital television service |
| 0X02 | digital television service |
| 0X03 | Teletext service |
| 0X04 | NVOD reference service |
| 0X05 | NVOD time-shigted service |
| 0X06 | mosaic service |
| 0X07 | PAL coded signal |
| 0X08 | SECAM coded signal |
| 0X09 | D/D2-MAC |
| 0X0A | FM Radio |
| 0X0B | NTSC coded signal |
| 0X0C | data broadcast service |
| 0X0D | reserved for Common interface Usage |
| 0X0E | RCS Map(see EN 301 790[24]) |
| 0X0F | RCS FLS(see EN 301 790[24]) |
| 0X10 | DVB MHP service |
| 0X11 | Frame-compatible 3DTV service |
| 0X12 | DVB 3D PIP service – The service carries 3D PIP television programming (audio, video, and associated 3D metadata) |
| 0X13 to 0X7F | reservde for future use |
| 0X80 to 0XFE | user defined |
| 0XFF | reserved for future use |

FIG. 21

| Syntax | Bits | Identifier |
|---|---|---|
| component_descriptor(){ | | |
|     descriptor_tag | 8 | uimsbf |
|     descriptor_length | 8 | uimsbf |
|     resrved_future_use | 4 | Bslbf |
|     stream_content | 4 | uimsbf |
|     component_type | 8 | uimsbf |
|     component_tag | 8 | uimsbf |
|     ISO 639-2 [3] _language_code | 24 | Bslbf |
|     for (i=0;<N;i++){ | | |
|         text_char | 8 | uimsbf |
|     } | | |
| } | | |

FIG. 22

| Stream content | Component type | Description |
|---|---|---|
| 0x01 | 0x11 | MPEG-2 video, Frame-compatible 3D video, 25Hz |
| 0x01 | 0x12 | MPEG-2 video, Frame-compatible 3D video, 30Hz |
| 0x01 | 0x13 | MPEG-2 video, 3D PIP video for 3D Stereoscopic video, 25Hz |
| 0x01 | 0x14 | MPEG-2 video, 3D PIP video for 3D Stereoscopic video, 30Hz |
| 0x03 | 0x14 | DVB subtitles (normal) for display on 3D monitor |
| 0x03 | 0x24 | DVB subtitles (for the hard of hearing) for display on 3D monitor |
| 0x05 | 0x11 | AVC/H.264 video, Frame-compatible 3D video, 25Hz |
| 0x05 | 0x12 | AVC/H.264 video, Frame-compatible 3D video, 30Hz |
| 0x05 | 0x13 | AVC/H.264 video, 3D PIP video for 3D Stereoscopic video, 25Hz |
| 0x05 | 0x14 | AVC/H.264 video, 3D PIP video for 3D Stereoscopic video, 30Hz |

FIG. 23

| Syntax | No. of bits | Format |
|---|---|---|
| 3D_PIP_video_descriptor_SDT ( ) { | | |
| descriptor_tag | 8 | 0xTBD |
| descriptor_length | 8 | uimsbf |
| descriptor_tag_extension | 8 | uimsbf |
| reserved | 1 | '1' |
| number_elements | 7 | uimsbf |
| for (j=0; j<number_elements; j++) { | | |
| component_tag | 8 | uimsbf |
| } | | |
| } | | |

FIG. 32

```
<simpleType name="TypeOfSourceType">
  <restriction base="string">
    <enumeration value="HD"/>
    <enumeration value="SD"/>
    <enumeration value="PIP"/>
    <enumeration value="SdBarker"/>
    <enumeration value="HdBarker"/>
    <enumeration value="PipBarker"/>
    <enumeration value="3DHD"/>
    <enumeration value="3DSD"/>
    <enumeration value="3DPIP"/>
  </restriction>
</simpleType>
```

FIG. 34

```
<complexType name="PIPDisplayOptionFor3DType">
 <sequence>
  <element name="PIPOffsetDepth" type="unsignedInt"/>
  <element name="PIPBoundaryOffsetDepth" type="unsignedInt"/>
  <element name="PIPBoundaryThickness" type="unsignedInt"/>
 </sequence>
</complexType>
```

FIG. 38

```
<complexType name="PIPImplementationFor3DType">
  <sequence>
    <element name="PIPRecommendedMode"
type="cddc:PIPRecommendedModeType" maxOccurs="unbounded"/>
  </sequence>
</complexType>
<complexType name="PIPRecommendedModeType">
  <sequence>
    <element name="PIPDepthControl">
      <complexType>
        <choice>
          <element name="Asymmetric">
            <complexType>
              <attribute name="PIPDepthMin" type="unsignedInt" use="required"/>
              <attribute name="PIPDepthMax" type="unsignedInt" use="required"/>
            </complexType>
          </element>
          <element name="Symmetric">
            <complexType>
              <attribute name="PIPDepthRange" type="unsignedInt" use="required"/>
            </complexType>
          </element>
        </choice>
      </complexType>
    </element>
    <element name="PIPSize">
      <complexType>
        <choice>
          <element name="PIPResolution">
            <complexType>
              <attribute name="Width" type="unsignedInt" use="required"/>
              <attribute name="Height" type="unsignedInt" use="required"/>
            </complexType>
          </element>
          <element name="PIPResolutionMode" type="unsignedByte"/>
        </choice>
      </complexType>
    </element>
  </sequence>
  <attribute name="PriorityID" type="unsignedByte" use="required"/>
</complexType>
</schema>
```

DIGITAL RECEIVER AND METHOD FOR PROCESSING 3D CONTENT IN THE DIGITAL RECEIVER

This application is a 35 USC §371 National Stage entry of International Application No. PCT/KR2011/006494 filed on Sep. 1, 2011, and claims priority of U.S. Provisional Application Nos. 61/379,374 filed on Sep. 1, 2010, all of which are incorporated by reference in their entirety herein.

TECHNICAL FIELD

The present invention relates to a digital receiver, and more particularly, to a digital receiver that processes 3-dimensional content and a method of processing the same.

BACKGROUND ART

With introduction of 3-Dimensional Televisions (3DTVs), transmission of 3D image content of through digital broadcasting as well as distribution of 3-dimensional (3D) image content based on storage media has accelerated.

Generally, a 3-dimensional image provides a stereoscopic effect using a stereo vision principle. Humans experience a perspective effect through binocular parallax, i.e. parallax based on the distance between the two eyes, which is about 65 mm. Consequently, the 3D image may provide a stereoscopic effect and a perspective effect based on a planar image related to the left eye and the right eye.

A 3D image display method may include a stereoscopic type display method, a volumetric type display method, and a holographic type display method. In the stereoscopic type display method, a left view image, which is viewed through the left eye, and a right view image, which is viewed through the right eye, are provided, and a user views the left view image and the right view image through the left eye and the right eye, respectively, using polarized glasses or a display device to perceive a 3D image effect.

Meanwhile, as previously described, the left view image and the right view image of the 3D content are transmitted to a digital receiver, which properly processes the left view image and the right view image of the 3D content into a 3D image. Consequently, signaling information to process the 3D content is required.

Also, the digital receiver requires a higher hardware level and processing capability than a conventional digital receiver to receive and process the 3D content.

However, the digital receiver still does not support or process services available for 2D content with respect to 3D content, resulting in user inconvenience.

DISCLOSURE

Technical Problem

The present invention has been made in view of the above problems, and an object of the present invention is to support a service which is supported in a 2D environment even in a 3D environment.

Another object of the present invention is to provide an apparatus and method that are capable of properly processing a PIP or preview service in addition to a main service related to a 3D service.

Another object of the present invention is to define and provide signaling information regarding a 3D PIP or preview service.

A further object of the present invention is to apply a 3D PIP or preview service to a content guide using information regarding the 3D PIP or preview service.

Technical Solution

A digital receiver and a method of processing 3D video data in the digital receiver according to the present invention are disclosed.

An example of a digital receiver that processes 3D video data according to the present invention includes a receiving unit to receive a first broadcast signal including a first 3D service and first signaling data for the first 3D service through a first channel and to receive a second broadcast signal including a second 3D service related to the first 3D service and second signaling data for the second 3D service through a second channel, a demultiplexer to demultiplex the 3D service data and the signaling data from the first broadcast signal and the second broadcast signal, a controller to acquire information regarding a channel to receive the second broadcast signal based on the demultiplexed first signaling data to control reception of the second broadcast signal and to control the 3D service data in the second broadcast signal received based on the second signaling data to be output to a predetermined position of a display screen, a decoder to decode the 3D service data, a formatter to format the decoded 3D service data according to an output format of the display screen, and a display unit to output the formatted 3D service data to the display screen.

An example of a digital receiver that processes 3D video data according to the present invention includes a receiving unit to receive a first broadcast signal including a first 3D service and first signaling data for the first 3D service through a first channel and to receive a second broadcast signal including a second 3D service related to the first 3D service and second signaling data for the second 3D service through a second channel, a demultiplexer to demultiplex the 3D service data and the signaling data from the first broadcast signal and the second broadcast signal, a controller to control the received second broadcast signal to be converted into a 3D extended service and output to a predetermined position of a display screen based on the demultiplexed first signaling data, a decoder to decode the 3D service data, a formatter to format the decoded 3D service data according to an output format of the display screen, and a display unit to output the formatted 3D service data to the display screen.

An example of a method of processing 3D video data in a digital receiver according to the present invention includes receiving a first broadcast signal including a first 3D service and first signaling data for the first 3D service through a first channel, receiving a second broadcast signal including a second 3D service related to the first 3D service and second signaling data for the second 3D service through a second channel based on the first signaling data, decoding the 3D service data based on the second signaling data, and outputting the decoded first 3D service data and the decoded second 3D service data to predetermined regions of a display screen.

Another example of a method of processing 3D video data in a digital receiver according to the present invention includes receiving a first broadcast signal including a first 3D service and first signaling data for the first 3D service through a first channel, receiving a second broadcast signal including a second 3D service related to the first 3D service and second signaling data for the second 3D service through a second channel, parsing the 3D service data and the signaling data from the first broadcast signal and the second broadcast signal, converting the second 3D service data into a 3D extended service based on the first signaling data, decoding the 3D service data, and outputting the decoded 3D service data to predetermined regions of a display screen.

The first 3D service may be a 3D base service or a 3D extended service, the second 3D service may be a 3D extended service or a 3D base service decided according to type of the first 3D service, and the 3D extended service may be a 3D PIP service and/or a 3D preview service.

The first signaling data may include information to identify whether the first 3D service transmitted through a corresponding virtual channel is the 3D base service or the 3D extended service.

In a case in which the first 3D service is the 3D base service, the first signaling data may include connection information to identify whether the 3D extended service linked to the 3D base service is present and to receive the 3D extended service.

In a case in which the first 3D service is the 3D base service, the first signaling data may include connection information to identify whether all linked services comprising the 3D extended service linked to the 3D base service are present and to receive the respective linked services.

In a case in which the first 3D service is the 3D extended service, the first signaling data may include connection information to identify whether the 3D base service linked to the 3D extended service is present and to receive the 3D base service.

The first signaling data may include at least one selected from among information regarding a distance from a depth plane at which the extended service is to be located to the display screen, information regarding a distance from a depth plane at which an edge of the extended service is to be located to the display screen, and information indicating a thickness of an edge to be spaced by a boundary of the extended service, to output the 3D extended service to the display screen.

The first signaling data may include information regarding a size of the extended service and/or information regarding depth symmetry of the extended service to output the 3D extended service to the display screen, the information regarding the size of the extended service may include information regarding a height and a width of the extended service and/or information regarding resolution of the extended service, and the information regarding the depth symmetry of the extended service may include information regarding a depth range of the extended service and/or information regarding a minimum depth value and a maximum depth value of the extended service.

Advantageous Effects

The present invention has the following effects.

First, the present invention has an effect of supporting a service which is supported in a 2D environment even in a 3D environment.

Second, the present invention has an effect of signaling, appropriately processing, and providing a 3D PIP or preview service to a user.

Third, the present invention has an effect of applying the 3D PIP or preview service to a content guide, thereby improving convenience in a 3D service and achieving easy use of the 3D service.

DESCRIPTION OF DRAWINGS

FIG. 4 is a view illustrating an example of configuration of Terrestrial Virtual Channel Table (TVCT) sections according to the present invention;

FIG. 5 is a view illustrating an example of definition of a service_type field according to the present invention;

FIG. 6 is a view illustrating an example of configuration of an extended_service_descriptor according to the present invention;

FIG. 7 is a view illustrating an example of an extended_service_type field of FIG. 6;

FIG. 8 is a view illustrating an example of configuration of a service_linkage_descriptor according to the present invention;

FIG. 9 is a view illustrating an example of a linked_service_type field of FIG. 8;

FIG. 10 is a view illustrating an example of configuration of a base_service_descriptor according to the present invention;

FIG. 12 is a view illustrating an example of configuration of a 3D_PIP_display_option_descriptor according to the present invention;

FIG. 13 is a view illustrating an example of configuration of a 3D_PIP_implementation_descriptor according to the present invention;

FIG. 14 is a view illustrating an example of a PIP_resolution_mode field of FIG. 13;

FIG. 18 is a view illustrating an example of parameters for 3D PIP realization according to the present invention;

FIG. 19 is a view illustrating an example of Service Description Table (SDT) sections according to the present invention;

FIG. 20 is a view illustrating an example of configuration of a service_type field according to the present invention;

FIG. 21 is a view illustrating an example of configuration of a component_descriptor according to the present invention;

FIG. 22 is a view illustrating an example of configuration of a stream_content field and a component_type field of FIG. 21;

FIG. 23 is a view illustrating an example of configuration of a 3D_PIP_video_descriptor according to the present invention;

FIG. 32 is a view illustrating an example of a TypeOfSourceType XML schema structure according to the present invention;

FIG. 34 is a view illustrating another example of a PIPDisplayOptionFor3DType XML schema structure according to the present invention;

FIG. 38 is a view illustrating another example of a PIPImplementationFor3DType XML schema structure according to the present invention;

BEST MODE

Figure 1:
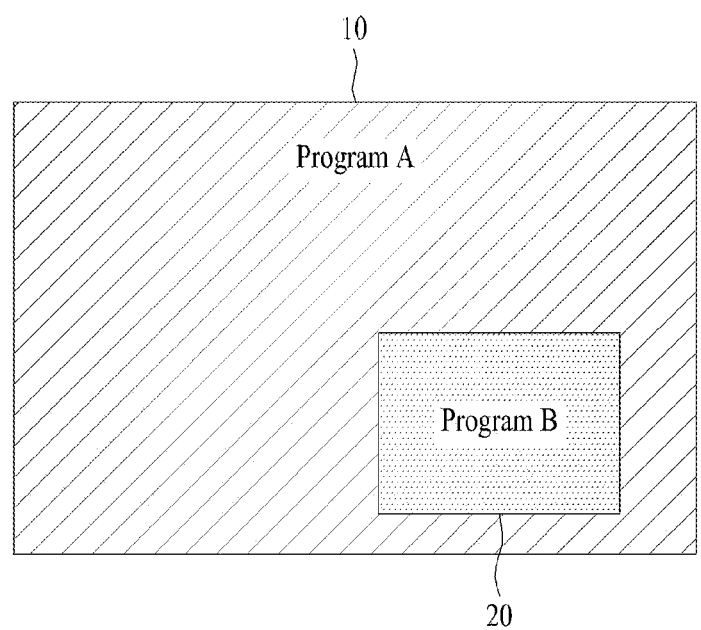
FIG. 1 is a view showing an example of a base service and Picture-In-Picture (PIP) service signal output screen.

Reference will now be made in detail to the preferred embodiments of the present invention, examples of which are illustrated in the accompanying drawings. It should be noted herein that these embodiments are only for illustrative purposes and the protection scope of the invention is not limited or restricted thereto.

Terms used in this specification are general terms selected in consideration of function and widely used at the present time. However, such terms may vary depending upon intentions of those skilled in the art to which the present invention pertains, usual practices, or appearance of new technology. In a specific case, some terms may be selected by the applicant of the present application. In this case, meanings of such terms will be described in corresponding paragraphs of the specification. Therefore, it should be noted that terms used in this specification be interpreted based on real meanings of the terms and the disclosure of the present invention, not simple dictionary definition of the terms.

A 3-dimensional (3D) image processing method may include a stereoscopic image processing method considering two viewpoints and a multi view image processing method considering three or more viewpoints. On the other hand, a conventional single view image processing method may be referred to as a monoscopic image processing method.

In the stereoscopic image processing method, the same subject is captured by a left camera and a right camera, which are spaced apart from each other by a predetermined distance, and the captured left view image and right view image are used as an image pair. In the multi view image processing method, on the other hand, three or more images captured using three or more cameras disposed at predetermined intervals or angles are used. Hereinafter, the stereoscopic image processing method will be described as an example for easy understanding of the present invention and for the convenience of description; however, the present invention is not limited thereto. The present invention may be applied to the multi view image processing method.

The stereoscopic image processing method may include a side by side type image processing method, a top and bottom type image processing method, and a checker board type image processing method. For example, in the side by side type image processing method, a left view image and a right view image are ½ downsampled in the horizontal direction, and one of the sampled images is located at a left region and the other sampled image is located at a right region to configure a stereoscopic image. In the top and bottom type image processing method, a left view image and a right view image are ½ downsampled in the vertical direction, and one of the sampled images is located at a top region and the other sampled image is located at a bottom region to configure a stereoscopic image. In the checker board type image processing method, a left view image and a right view image are ½ downsampled such that the left view image and the right view image intersect in the vertical direction and in the horizontal direction to configure a stereoscopic image using the left view image and the right view image. However, the stereoscopic image processing method according to the present invention described in this specification is not limited or restricted to the above examples.

Meanwhile, 2-dimensional (2D) content and 3D content may coexist. For this reason, it is necessary to consider compatibility between 3D content and 2D content during transmission of the 3D content. For example, a digital receiver which does not support a 3D service may receive a 3D signal and process the 3D signal into a 2D service. On the other hand, a digital receiver which supports a 3D service may receive a 3D signal and provide a 3D service. However, the digital receiver which supports the 3D service may provide a 2D service according to circumstances.

In the recent digital environment, much research has been conducted to support a 3D service. A digital transmitter or receiver provides all services related to 2D content. However, the digital transmitter or receiver does not properly provide all services related to 3D content. For example, the digital transmitter or receiver provides an extension service, such as a picture in picture (PIP) or a preview service, in connection with 2D content. However, the digital transmitter or receiver does not properly provide an extension service, such as a PIP or a preview service, in connection with 3D content. For this reason, signaling information regarding such an extension service in connection with 3D content is required in the digital transmitter or receiver. Hereinafter, various methods of providing a 3D extension service according to the present invention and a digital receiver to perform such methods will be described.

In connection with provision of a 3D extension service according to the present invention, it is necessary to consider various conditions. A PIP service will be described as an example of an extension service. In case of 2D content, merely the size of a screen may be scaled to easily provide a PIP service. In case of 3D content, on the other hand, it is not possible to properly provide a PIP service simply by scaling the size of a screen. This is because, in case of the 3D content, it is not sufficient to consider only the extension service, and, if a relationship between a base service and the extension service is properly considered, user confusion may be brought about, unlike the 2D content.

Hereinafter, various embodiments to provide a 3D extension service according to the present invention will be described in detail in consideration of the above matters with reference to the accompanying drawings.

A "3D extension service" used in this specification is an additional or extension service to provide additional 3D video data, which are different from subtitle data, on a screen in addition to a 3D base service. The 3D extension service may include a 3D PIP service and a 3D preview service; however, the present invention is not limited thereto.

FIG. 1 is a view showing an example of a base service and PIP service signal output screen.

Referring to FIG. 1, program A 10 provided on a screen of a digital receiver indicates a main image service, and program B 20 provided on a predetermined region of the screen on which program A 10 is provided indicates a PIP image service.

Program A 10 and program B 20 may be received and provided through tuning of different (virtual) channels of the digital receiver.

Figure 2:
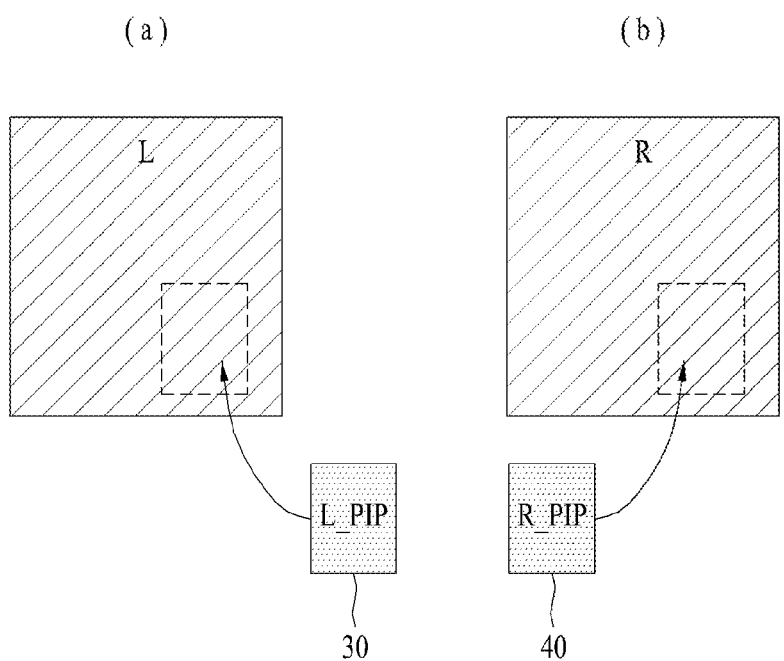
FIG. 2 is a view illustrating an example of coupling and outputting a 3-dimensional (3D) base service and a 3D PIP service according to the present invention.
Figure 3:
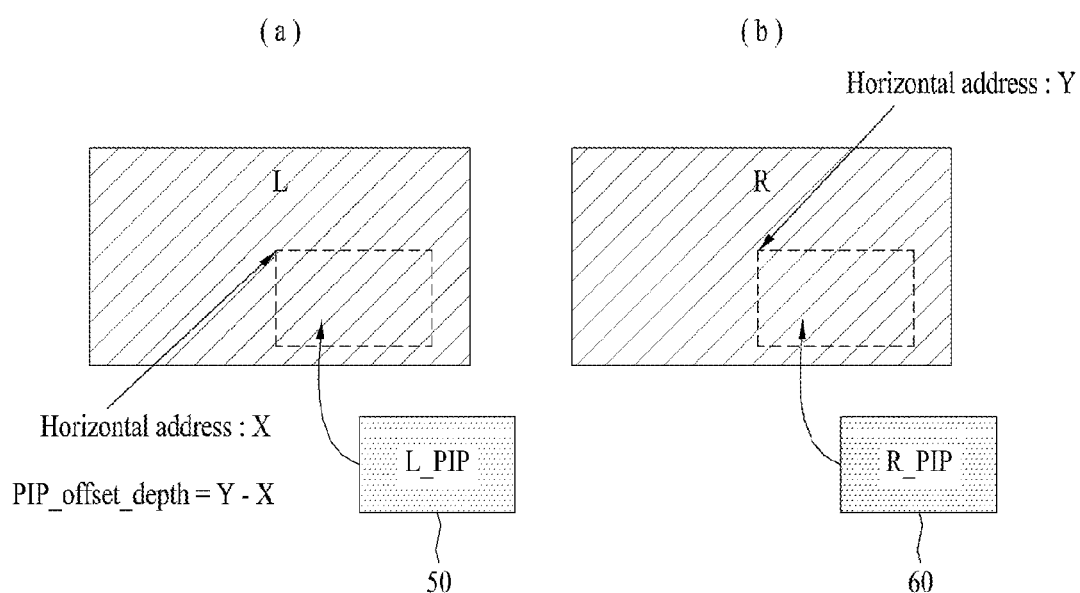
FIG. 3 is a view illustrating another example of coupling and outputting a 3D base service and a 3D PIP service according to the present invention.

FIG. 2 is a view illustrating an example of coupling and outputting a 3D base service and a 3D PIP service according to the present invention, and FIG. 3 is a view illustrating another example of coupling and outputting a 3D base service and a 3D PIP service according to the present invention.

It is assumed that FIG. 1 shows an example of a screen to which a 2D base service is output in a state in which a 2D PIP service is coupled to the 2D base service. In order to configure the above screen, the digital receiver may scale, i.e. reduce, the size of the screen for the 2D PIP service as compared with the size of the screen for the 2D base service as shown in FIG. 1.

On the other hand, FIGS. 2 and 3 show a 3D service, which is different from the 2D service of FIG. 1. In order to couple and output a 3D base service and a 3D PIP service, it is necessary to consider basic characteristics of 3D content such that the digital receiver properly processes the 3D content and provides a 3D service to users.

FIG. 2 shows a case in which the 3D base service and the 3D PIP service have a half resolution. On the other hand, FIG. 3 shows a case in which the 3D base service and the 3D PIP service have a full resolution.

Referring to FIGS. 2 and 3, a PIP service is basically a 3D service, and therefore, it is necessary for the digital receiver to acquire left view PIP data 30 and 50, which are left view data, as shown in FIGS. 2(a) and 3(a) and right view PIP data 40 and 60, which are right view data, as shown in FIGS. 2(b) and 3(b) in order to provide a 3D PIP service.

However, it is difficult for the digital receiver to properly couple and output a 3D base service and a 3D PIP service merely by acquiring the left view PIP data and the right view PIP data. This is because a base service is a 3D service, and therefore, it is necessary to consider a relationship between the 3D PIP service and the 3D base service. For example, if the digital receiver provides the 3D PIP service at the same depth as the 3D base service for the 3D base service provided on the screen at a predetermined depth, an effect of the PIP service may be insignificant or the 3D base service may be rather confused. In other words, in order for the digital receiver to properly process the 3D service, it is necessary to achieve signaling of the 3D PIP service as well as signaling of the 3D base service unlike the 2D service.

Hereinafter, therefore, various signaling data necessary for a digital transmitter or receiver to provide a 3D extension service as well as a 3D base service will be defined and described.

In a conventional digital broadcasting environment, a 2D service is mainly considered, and information regarding a codec for a 3D service is not properly defined in connection with the present invention. For this reason, it is difficult for a digital transmitter or receiver to process the 3D service.

For example, in a case in which a 3D PIP service is used as an example of a 3D extension service, it is necessary to define the position of a depth plane at which a PIP screen is to be located, i.e. a PIP screen with offset depth toward a viewer side, a method of acquiring an 3D PIP image, and a PIP boundary style.

In providing a 3D extension service according to the present invention, metadata may be provided such that the 3D extension service is provided as an additional stream or a base stream like a 3D base service or is realized as an extension service, and such an extension service may be provided using the metadata.

In the former case, an additional stream to provide an extension service is present, and therefore, it is necessary for signaling of a 3D PIP stream to be configured in the shape form as well as signaling of a 3D elementary stream. For example, a 3D television (3DTV) receives information stating that a 3D PIP service is transmitted through an additional virtual channel and receives a PIP stream through tuning of the corresponding virtual channel using the information. In the present invention, a relationship between a 3D service and a 3D PIP/preview service through different virtual channels is signaled to receive an integrated service (A method of recognizing that a 3D PIP service connected to a different virtual channel is present).

In the latter case, display size conversion information, for example, is necessary as metadata for 3D PIP realization. This may be necessary to be applied to, for example, various screen size PIP, preview, thumbnail, etc.

Meanwhile, the PIP boundary style may be, for example, information regarding a boundary width of a PIP screen, an effect of PIP edges, etc.

In other words, a broadcasting station may signal a PIP stream/preview stream of an additional virtual channel for a 3D PIP/preview service, or a receiver may convert a 3D image into a screen having a small size for PIP/preview output through a conversion parameter transmitted from the broadcasting station and output the image at a proper depth.

The present invention provides a broadcast signaling method necessary to view a 3D image from another broadcasting station in a PIP form during viewing of a 3D image channel. A function to acquire and display a small 3D output screen may be applied to PIP. In addition, this function may be applied to a case in which a preview screen is output in an advanced electronic program guide (EPG) type menu or a case in which a thumbnail is displayed during viewing of a recorded 3D image such that a viewer moves to a desired position.

The present invention relates to a method of generating a 3D screen having a small size from a 3D image having a standard size. In a present digital television (DTV), broadcast signaling used to realize an image having a small size is not present. In a 3D image, however, parameters to be changed based on display size are present unlike a 2D image. In a case in which these parameter values are signaled to metadata, it is possible for the receiver to output a 3D image having a desired size through metadata.

As is apparent from the above description, the present invention proposes a method of processing signaling information regarding a 3D PIP video broadcast service in a 3D TV. In particular, the present invention proposes a method of receiving a PIP broadcast service using corresponding signaling information and controlling stereoscopic PIP display in a 3D TV.

In addition, it is possible to individually transmit 3D and 3D PIP services through independent and separate logical channels (virtual channels) using the present invention. Also, a 3D service and metadata usable when the 3D service is viewed in a PIP form may be signaled without transmission of an additional 3D PIP stream to properly configure a 3D PIP. During viewing of a 3D screen, therefore, it is possible for a user to view a 3D screen of another channel or perform a 3D preview in a menu using this method.

In other words, in using a 3D service and a 3D PIP/preview service, when independent PIP streams are transmitted, the receiver may clearly recognize a corresponding relationship between the two services to check whether a 3D service and a corresponding 3D PIP service are present, and correspondence is possible when a user requests change to a PIP/preview screen. Also, even in a case in which such an additional PIP stream is not present, the 3D service may be properly changed to a PIP/preview service and the PIP/preview service may be output using additional metadata for PIP.

Hereinafter, a case in which a 3D extension service is transmitted in an individual stream form will be described in detail with reference to the accompanying drawings.

In connection with the present invention, service data for a 3D broadcast service is based on an Advanced Television Systems Committee (ATSC) system. Accordingly, signaling data for the service data may also be defined as PSI/PSIP. In particular, a Program Association Table (PAT), a Program Map Table (PMT), a Virtual Channel Table (VCT), and an Event Information Table (EIT) will be described as an example of the PSI/PSIP information for easy understanding of the present invention and for the convenience of description. However, various tables in the PSI/PSIP may be used in addition to the above tables.

FIG. 4 is a view illustrating an example of configuration of Terrestrial Virtual Channel Table (TVCT) sections according to the present invention.

The TVCT sections are provided to basically provide attribute information of virtual channels. In connection with the present invention, the TVCT sections may be used to identify a 3D PIP service as well as a 3D base service.

Particularly, in order to identify a 3D PIP service according to the present invention, a service_type field to identify service type of a corresponding channel in the TVCT sections is used. For example, as will hereinafter be described, it is possible to identify whether service type of a corresponding channel is a 3D extension (PIP) service from a value of the service_type field in the present invention.

Hereinafter, respective fields constituting the TVCT sections will be described in more detail with reference to FIG. 4.

A table_id field indicates type of table sections. For example, in a case in which corresponding table sections are table sections configuring the TVCT table, this field may have a value of 0xC8. A section_syntax_indicator field is composed of 1 bit and has a fixed value of 1. A private_indicator field is set to 1. A section_length field is composed of 12 bits, and the first two bits thereof are 00. The length of the section to a CRC field after this field is indicated by bytes. A transport_stream_id field is composed of 16 bits and indicates an MPEG-2 Transport stream (TS) ID. This TVCT may be distinguished from another TVCT by this field. A version_number field indicates a version of the table sections. Whenever a version is changed, the version_number field is incremented by 1, and, when the version value reaches 31, the next version value becomes 0. A current_next_indicator field is composed of 1 bit. When the VCT is currently applicable, this field is set to 1. If a value of this field is set to 0, it means that this field is not yet applicable, and the next field is available. A section_number field indicates the number of sections constituting the TVCT table. A last_section_number field indicates the last section constituting the TVCT table. A protocol_version field functions to allow a table kind different from that defined by the current protocol in future. In the current protocol, only 0 is a valid value. Values other than 0 will be used in a later version for a structurally different table.

A num_channels_in_section field indicates the number of virtual channels defined in the VCT sections. Hereinafter, information regarding the corresponding channels will be defined in a loop form by the number of virtual channels defined in the num_channels_in_section field. Fields defined with respect to the corresponding channels in the loop form are as follows.

A short_name field indicates names of virtual channels.

A major_channel_number field indicates a major channel number of a virtual channel defined in a corresponding order in a 'for' repetition sentence. Each virtual channel has multiple parts, such as a major channel number and a minor channel number. The major channel number functions as a reference number to a user for the corresponding virtual channel together with the minor channel number. A minor_channel_number field has a value of 0 to 999. The minor channel number functions as a two-part channel number together with the major channel number.

A modulation_mode field indicates a modulation mode of a transmission carrier related to a corresponding virtual channel.

A carrier_frequency field may indicate a carrier frequency. A channel_TSID field has a value of 0x0000 to 0xFFFF. This channel is an MPEG-2 TSID related to a TS transmitting an MPEG-2 program referred to by this virtual channel.

A program_number field correlates a virtual channel defined in the TVCT with a Program Association Table (PAT) and a Program Map Table (PMT) of MPEG-2.

An ETM_location field indicates the presence and location of an Extended Text Message (ETM).

An access_controlled field is a flag field. In a case in which this field is 1, it may indicate that an event related to a corresponding virtual channel is access controlled. In a case in which this field is 0, it may indicate that access is not limited.

A hidden field is a flag field. In a case in which this field is 1, access is not allowed although a user directly inputs a corresponding number. A hidden virtual channel is skipped when the user performs channel surfing, and it appears as if the hidden virtual channel is not defined.

A hide_guide field is a flag field. In a case in which this field is set to 1 for a hidden channel, a virtual channel and an event thereof may be display on an EPG display. In a case in which a hidden bit is not set, this field is ignored. Consequently, a non-hidden channel and an event thereof are displayed on the EPG display irrespective of status of the hide_guide field.

A service_type field identifies type of a service transmitted by a corresponding virtual channel. In particular, the service_ type field may be used to identify whether type of a service provided by a corresponding channel is a 3D extension service, as previously described. For example, FIG. 5 is a view illustrating an example of definition of a service_type field according to the present invention. Referring to FIG. 5, in a case in which a value of this field is 0x13, it may indicate a 3D (base) service, and, in a case in which a value of this field is 0x14, it may indicate a 3D extension service.

It is possible to define a 3D extension service in more detail using a value of this field. For example, in a case in which a value of this field is 0x14, it may indicate a 3D PIP service, which is an example of the 3D extension service, and, in a case in which a value of this field is 0x15, it may indicate a 3D preview service, which is another example of the 3D extension service.

A source_id field identifies a programming source related to a virtual channel. The source may be any one selected from among video, text, data, or audio programming. The source_id field has a value of 0, which is reserved. From 0x0001 to 0x0FFF, the source_id field has a unique value in a TS transmitting a VCT. Also, the source_id field has a unique value in a region level from 0x1000 to 0xFFFF.

A descriptors_length field indicates the length of following descriptors for a corresponding virtual channel in bytes.

No descriptor may be included in descriptor( ) or one or more descriptors may be included in descriptor( ). This descriptor( ) field may include descriptors variously defined in connection with a 3D extension service according to the present invention, as will hereinafter be described.

A additional_descriptors_length field indicates the total length of a following VCT descriptor list in bytes.

A CRC_32 field indicates a Cyclic Redundancy Check (CRC) value, by which a register in the decoder has a zero output.

Meanwhile, in the present invention, at least one of the following descriptors may be included as descriptors of the TVCT table sections. Kinds of the respective descriptors defined and included therein may be changed, for example, depending upon whether service type of a corresponding channel is a 3D base channel or a 3D PIP channel.

For example, in a case in which service type of a corresponding channel is a 3D base channel, a descriptor indicating whether a 3D PIP service is present and connection information may be defined and included in the form of a descriptor. On the other hand, in a case in which service type of a corresponding channel is a 3D PIP channel, a descriptor indicating connection information regarding a 3D base service may be defined and included in the form of a descriptor. In the above, information regarding a depth and edges may be defined in the form of a descriptor for a 3D PIP service.

Hereinafter, various descriptors defined to provide a 3D PIP service in the TVCT table sections according to the present invention will be described in more detail with reference to the accompanying drawings.

It is possible to know a channel, through which a 3D PIP video version (extended or linked service) for a corresponding VC is transmitted, using Extended_Service_descriptor (or service_linkage_descriptor) transmitted while being included in a 3D broadcast channel (in connection with a base service), which will hereinafter be described. On the other hand, it is possible to know a channel, through which a corresponding 3D video version (base service) for a corresponding 3D PIP virtual channel it transmitted, using Base_Service_descriptor (or service_linkage_descriptor) transmitted while being included in a 3D PIP channel.

In a 3D image, viewing environment factors, such as a target screen size and a viewing distance, are duly considered when the 3D image is produced as compared with a 2D image. Consequently, in a case in which a small screen is displayed in a screen, i.e. in a case in which an image, such as a PIP image, a preview image, or a thumbnail image, is output, it is not easy to simply sub-sample a full screen image to generate a small screen as in the conventional 2D image. For this reason, an additional stream may be used only to output a PIP screen, or metadata necessary to convert a large-size 3D screen into a small 3D screen may need to be additionally defined as follows.

In this specification, an extended service is a concept corresponding to a base service. In the present invention, the extended service does not mean a full screen 3D image of an additional video stream but means a PIP image 3D screen.

Also, the present invention relates to a method of acquiring signaling data regarding a 3D screen output including both an extended service video stream and a base service video stream and decoding a 3D video stream. Such a linked service may be considered as a concept of a base service and an extended service. Alternatively, another method of providing a list of all kinds of linked services at once may be considered. To this end, a Service Linkage descriptor may be used.

FIG. 6 is a view illustrating an example of configuration of an extended_service_descriptor according to the present invention.

For example, the extended_service_descriptor of FIG. 6 defines an extended service for a virtual channel defined through a service_type field in a loop of the TVCT table sections. For example, in a case in which the virtual channel is a 2D legacy channel, it may indicate a 3D channel (service) corresponding to the 2D legacy channel as an extended service. On the other hand, in a case in which the virtual channel is a 3D channel, it may indicate a 3D PIP channel (service) as an extended service. In the latter case, information regarding a depth range different from the above-mentioned PIP service is necessary, and therefore, a 3D preview channel (service) may be additionally indicated.

Respective fields constituting the extended_service_descriptor according to the present invention will hereinafter be described in more detail with reference to FIG. 6.

A descriptor_tag field is a field to identify a corresponding descriptor and may have a value indicating that the corresponding descriptor is an extended_service_descriptor.

A descriptor_length field provides information regarding the length of a corresponding descriptor.

A number_extended_channels field indicates the number of extended channels and may provide information regarding the channels extended in a loop structure by the indicated number of the extended channels as will hereinafter be described.

Hereinafter, respective fields defined by the loop structure linked to the number_extended_channels field will be described.

An extended_service_type field indicates type of an extended service provided through a corresponding extended channel. An example of extended_service_type is shown in FIG. 7. FIG. 7 is a view illustrating an example of the extended_service_type field of FIG. 6. For example, as previously described, in a case in which a value of this field is 0x00, it may indicate that type of a corresponding extended service is a 3D service, in a case in which a value of this field is 0x01, it may indicate that a corresponding extended service is a 3D PIP service, and, in a case in which a value of this field is 0x02, it may indicate that a corresponding extended service is a 3D preview service.

Meanwhile, virtual channel information regarding the extended service may refer to fields providing channel information in the TVCT table sections. For example, as shown in FIG. 6, ext_major_channel_number, ext_minor_channel_number, ext_source_id, ext_channel_TSID, and ext_program_number fields may be defined for an extended service as in major_channel_number, minor_channel_number, source_id, channel_TSID, and program_number fields defined in the TVCT table sections.

An ext_major_channel_number field and an ext_minor_channel_number field respectively indicate a major channel number and a minor channel number providing an extended service.

An ext_source_id field identifies a programming source related to an extended service.

An ext_channel_TSID field indicates a TSID for a TS transmitting an MPEG-2 program referred to by an extended service.

An ext_program_number field correlates a virtual channel defined in connection with an extended service with a Program Association Table (PAT) and a Program Map Table (PMT) of MPEG-2.

In a case in which extended_service_descriptor is present as a descriptor in the TVCT table sections according to the present invention, the digital receiver may identify information of an extended channel using this descriptor. In a case in which a corresponding channel is a 3D base channel, a channel providing a 3D PIP or 3D preview service may be defined by this descriptor. On the other hand, in a case in which a corresponding channel is a channel providing a 3D PIP or 3D preview service, a 3D base channel may be defined by this descriptor.

FIG. 8 is a view illustrating an example of configuration of a service_linkage_descriptor according to the present invention Referring to FIG. 8, the service_linkage_descriptor may provide information regarding other virtual channels linked to a virtual channel defined in a loop of the TVCT table sections.

The service_linkage_descriptor of FIG. 8 may replace or coexist with the extended_service_descriptor of FIG. 7.

In other words, when it is considered to provide information regarding a service list linked in this form, it is possible to provide all kinds of channel information linked to a specific virtual channel through the service_linkage_descriptor as shown in FIG. 8. The service_linkage_descriptor and the extended_service_descriptor are different from each other in that the extended_service_descriptor provides information regarding a service additionally extended from a base service, whereas it is possible for the service_linkage_descriptor to provide a relationship between linked services through any one of the services.

Hereinafter, respective fields constituting the service_linkage_descriptor will be described in more detail with reference to FIG. 8.

A descriptor_tag field is a field to identify a corresponding descriptor and may have a value indicating that the corresponding descriptor is a service_linkage_descriptor.

A descriptor_length field provides information regarding the length of a corresponding descriptor.

A number_linked_channels field indicates the number of other virtual channels linked to a virtual channel defined in a loop of the TVCT table sections, and may define fields providing information regarding virtual channels linked by corresponding numbers using a loop structure.

Hereinafter, the respective fields in the loop structure will be described.

A linked_service_type field indicates type of a linked service provided through a corresponding linked channel. For example, FIG. 9 is a view illustrating an example of the linked_service_type field of FIG. 8. Referring to FIG. 9, in a case in which a value of this field is 0x00, it may indicate that a service linked to a corresponding channels of the TVCT table sections is a 2D service, in a case in which a value of this field is 0x01, it may indicate that a corresponding linked service is a 2D PIP service, in a case in which a value of this field is 0x02, it may indicate that a corresponding linked service is a 3D service, in a case in which a value of this field is 0x03, it may indicate that a corresponding linked service is a 3D PIP service, and, in a case in which a value of this field is 0x04, it may indicate that a corresponding linked service is a 3D preview service.

Meanwhile, virtual channel information regarding the linked service may refer to fields providing channel information in the TVCT table sections. For example, as shown in FIG. 8, linked_major_channel_number, linked_minor_channel_number, linked_source_id, linked_channel_TSID, and linked_program_number fields may be defined for an extended service as in major_channel_number, minor_channel_number, source_id, channel_TSID, and program_number fields defined in the TVCT table sections.

A linked_major_channel_number field and a linked_minor_channel_number field respectively indicate a major channel number and a minor channel number of a corresponding linked channel.

A linked_source_id field identifies a programming source related to a corresponding linked channel.

A linked_channel_TSID field indicates a TSID for a TS transmitting an MPEG-2 program referred to by a corresponding linked channel.

A linked_program_number field correlates a virtual channel defined in connection with a corresponding linked channel with a Program Association Table (PAT) and a Program Map Table (PMT) of MPEG-2.

FIG. 10 is a view illustrating an example of configuration of a base_service_descriptor according to the present invention.

Referring to FIG. 10, in a case in which a 3D PIP service is provided through a corresponding virtual channel in a loop of the TVCT table sections, the base_service_descriptor provides information regarding to which base channel the 3D PIP service corresponds.

In order to inform a base service in the above extended service, the base_service_descriptor may be defined and used as shown in FIG. 10.

Referring to FIG. 10, in a case in which the base_service_descriptor is present in the TVCT table sections of the extended service, this descriptor provides channel information regarding a base service linked to the corresponding extended service. In a case in which a 3D PIP channel provides 3D channel information through this descriptor, it may also mean the provision of information regarding a 3D base service.

Major_channel_number, minor_channel_number, source_id, channel_TSID, and program_number information regarding virtual channels capable of receiving a base service of an extended service correspond to base_major_channel_number, base_minor_channel_number, base_source_id, base_channel_TSID, and base_program_number.

Hereinafter, respective fields constituting the base_service_descriptor will be described in more detail with reference to FIG. 10.

A descriptor_tag field is a field to identify a corresponding descriptor and may have a value indicating that the corresponding descriptor is a base_service_descriptor.

A descriptor_length field provides information regarding the length of a corresponding descriptor.

A base_major_channel_number field and a base_minor_channel_number field respectively indicate a major channel number and a minor channel number providing a corresponding base channel.

A base_source_id field identifies a programming source related to a corresponding base channel.

A base_channel_TSID field indicates a TSID for a TS transmitting an MPEG-2 program referred to by a corresponding base channel.

A base_program_number field correlates a virtual channel defined in connection with a corresponding base channel with a Program Association Table (PAT) and a Program Map Table (PMT) of MPEG-2.

Figure 11:
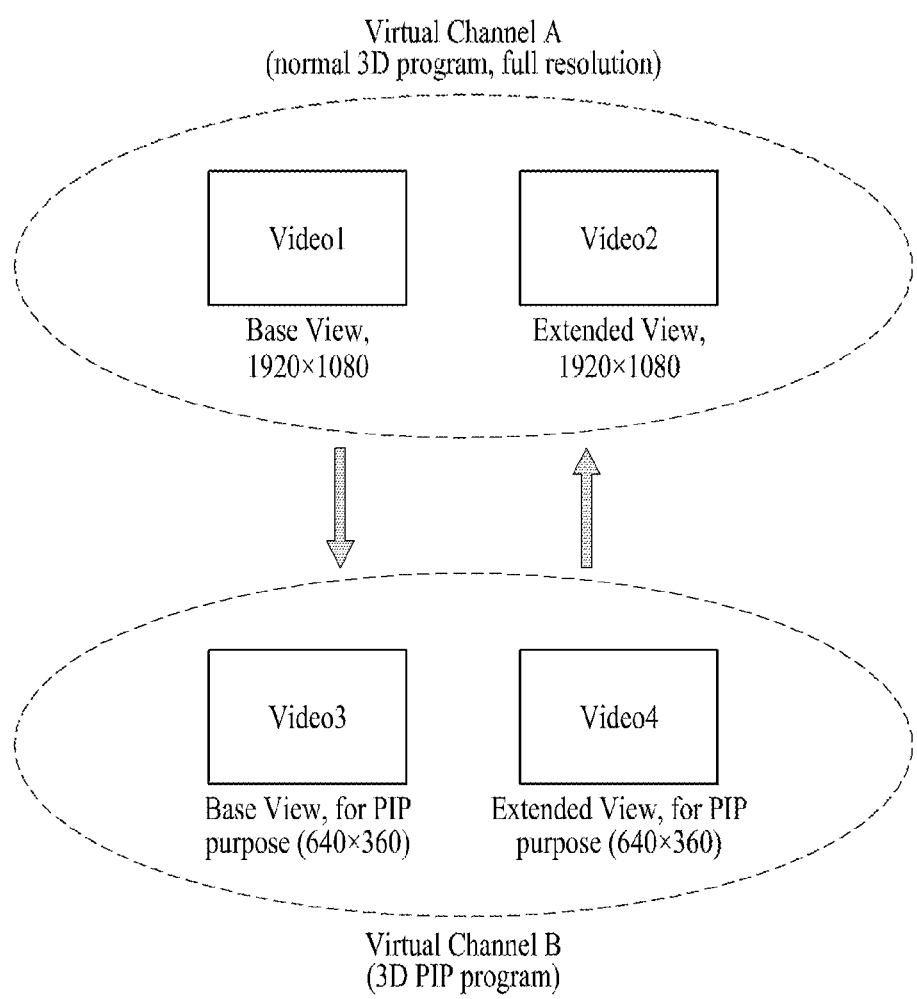
FIG. 11 is a view illustrating an example of configuration of virtual channels according to the present invention.

FIG. 11 is a view illustrating an example of configuration of a virtual channel according to the present invention.

FIG. 11 shows an example of configuration of virtual channels according to the present invention. The upper part 1110 of the drawing shows virtual channel A to provide a base program, i.e. a general 3D program (for example, full resolution), and the lower part 1120 of the drawings shows virtual channel B to provide a 3D PIP program.

A Packet Identifier (PID) for a video and audio elementary stream ES included in virtual channels A and B (3D channel and 3D PIP channel) is signaled.

As long as service identification is defined in the descriptor as shown in FIGS. 6 to 10, it is necessary to define information necessary to provide an extended service according to the present invention.

Hereinafter, such information will be defined. Descriptors according to the present invention will be described in more detail with reference to FIGS. 12 to 15.

FIG. 12 is a view illustrating an example of configuration of a 3D_PIP_display_option_descriptor according to the present invention.

FIG. 12 shows a 3D_PIP_display_option_descriptor to define display options to be considered, for example, when a 3D PIP service is output.

A descriptor_tag field is a field to identify a corresponding descriptor and may have a value indicating that the corresponding descriptor is a 3D_PIP_display_option_descriptor.

A descriptor_length field provides information regarding the length of a corresponding descriptor.

The 3D_PIP_display_option_descriptor defines information necessary when the digital receiver provides a 3D PIP on the screen. Such information may include the position of a depth plane at which a PIP is to be located, the position of a depth plane at which a PIP boundary is to be located, the thickness of the PIP boundary, and a PIP boundary style.

Hereinafter, respective fields included in the 3D_PIP_display_option_descriptor will be described in more detail with reference to FIG. 12.

A PIP_offset_depth field indicates the distance from a depth plane at which a PIP is to be located to the screen of the digital receiver. A value of this field may be used, for example, both in a case in which a PIP stream is additionally present and provided and in a case in which a general 3D video stream is converted into a PIP screen, which is used. That is, a value of this field is set by adjusting the digital receiver.

A PIP_boundary_offset_depth field indicates the distance from a depth plane at which a PIP edge is to be located to the screen of the digital receiver. A value of this field may also be used in all cases in which a PIP screen is to be displayed as in the above-mentioned PIP_offset_depth field.

A PIP_boundary_thickness field indicates the thickness of an edge to be displayed at the PIP boundary.

The digital transmitter may define and provide the 3D_PIP_display_option_descriptor of FIG. 12, and the digital receiver may parse this descriptor such that the descriptor is used to output a PIP service.

FIG. 13 is a view illustrating an example of configuration of a 3D_PIP_implementation_descriptor according to the present invention.

FIG. 13 also defines information, i.e. metadata, necessary for the digital receiver to realize a 3D PIP service according to the present invention. In particular, in a case in which a 3D PIP service is not additionally present, this descriptor may include various kinds of information to configure a 3D PIP from a general 3D service. In other words, it may be difficult to additionally provide a 3D PIP stream due to bandwidth limitations per physical channel. In this case, signaling regarding how an existing 3D base service is changed to be output as a PIP while guaranteeing an proper 3D effect may be provided such that the digital receiver efficiently outputs a PIP screen, instead of providing an additional 3D PIP stream. This descriptor defines and provides various kinds of information for a 3D PIP service together with or separately from FIG. 12.

Referring to FIG. 12, if the 3D_PIP_implementation_descriptor provides a depth range through depth_min and depth_max, it is possible for the digital receiver to re-map and convert a depth value of the provided 3D service to the provided range. In a case in which the depth range of the provided 3D service is given, depth_range_scaling_factor may be provided to reduce bit number instead of providing absolute values of the depth_min and the depth_max. Various re-mapping methods may be adopted.

A descriptor_tag field is a field to identify a corresponding descriptor and may have a value indicating that the corresponding descriptor is a 3D_PIP_implementation_descriptor.

A descriptor_length field provides information regarding the length of a corresponding descriptor.

A num_of_recommended_modes field indicates that a plurality of PIP conversion sizes and depth ranges may be transmitted for each mode, and it is possible to know the number of modes though a value of the num_of_recommended_modes.

Various kinds of information may be defined in a loop structure according to a recommended mode defined by the num_of_recommended_modes field.

A priority_bit field indicates priority of an output mode recommended when the digital receiver receives a 3D base service, converts the 3D base service into a 3D PIP, and outputs the 3D PIP.

A PIP_size_type field indicates a 3D PIP size type. In a case in which a value of this field is 0, PIP_width and PIP_height are transmitted. On the other hand, in a case in which a value of this field is 1, horizontal axis and vertical axis lengths of a PIP are indicated using PIP_resolution_mode.

PIP_width and PIP_height fields respectively indicate a horizontal axis length and a vertical axis length of a PIP screen. The defined length unit may be, for example, a pixel unit.

A PIP_resolution_mode field indicates a combination of widely used horizontal axis and vertical axis lengths of a PIP as a code. FIG. 14 is a view illustrating an example of the PIP_resolution_mode field of FIG. 13.

For example, referring to FIGS. 13 and 14, in a case in which a value of the PIP_resolution_mode field is 0x00, it may be indicated that a PIP resolution in a [pixel×pixel] unit is 360×240, in a case in which a value of the PIP_resolution_mode field is 0x01, it may be indicated that a PIP resolution is 240×160, in a case in which a value of the PIP_resolution_ mode field is 0x02, it may be indicated that a PIP resolution is 180×120, and, in a case in which a value of the PIP_resolution_mode field is 0x03, it may be indicated that a PIP resolution is 120×80.

A PIP_depth_symmetric field indicates whether a PIP depth value is symmetric. In a case in which a value of this field is 0, a positive parallax depth range and a negative parallax depth range are different from each other. That is, a PIP depth value is non-symmetric. Consequently, it is necessary to provide depth range values for the positive parallax depth range and the negative parallax depth range such that the depth range values are properly processed by the digital receiver. The depth range values may be defined using a PIP_depth_min field and a PIP_depth_max field. Meanwhile, in a case in which a value of the PIP_depth_symmetric field is 1, a positive parallax depth range and a negative parallax depth range are symmetric. Consequently, it is sufficient to define and transmit only one PIP_depth_range value applicable to both the positive parallax depth range and the negative parallax depth range. For example, in a case in which a disparity range is between −X and +Y, and X=Y, it is a symmetric range.

PIP_depth_min and PIP_depth_max fields indicate a depth range of a main video or a 3D video output to a PIP screen.

The PIP_depth_min field indicates a depth located farthest from a user of depths expressed in the 3D video. This value may be expressed as a depth, and may be a disparity value to express binocular parallax.

The PIP_depth_min field indicates a depth located closest to a user of depths output by the 3D video. In the same manner, the depth of this field may be expressed as a disparity value. In a case in which the depth is expressed as a concept of disparity, for example, the PIP_depth_min value may be greater than the PIP_depth_max value.

In a case in which, on the basis of a plane having a depth of 0, a depth range of the previous plane and a depth range of the next plane have the same value, a PIP_depth_range field indicates the value.

A PIP_Horizontal_position field and a PIP_vertical_position field may decide a region of the display screen on which a PIP is provided in the digital receiver. This field information may be position information regarding the optimum region decided based on a relationship with a base service provided on the display screen at the transmission side. In a case in which this information conflicts with PIP information preset in the digital receiver, the digital receiver may ignore this field information, or, since a relationship with a base service is considered when the PIP is provided, this field information may have priority, and a PIP screen may be configured and provided accordingly. Also, this field information may be provided while being included in the descriptor of FIG. 12 in addition to this descriptor.

Hereinafter, the respective parameters in connection with FIGS. 12 to 14 will be described in more detail.

Figure 15:
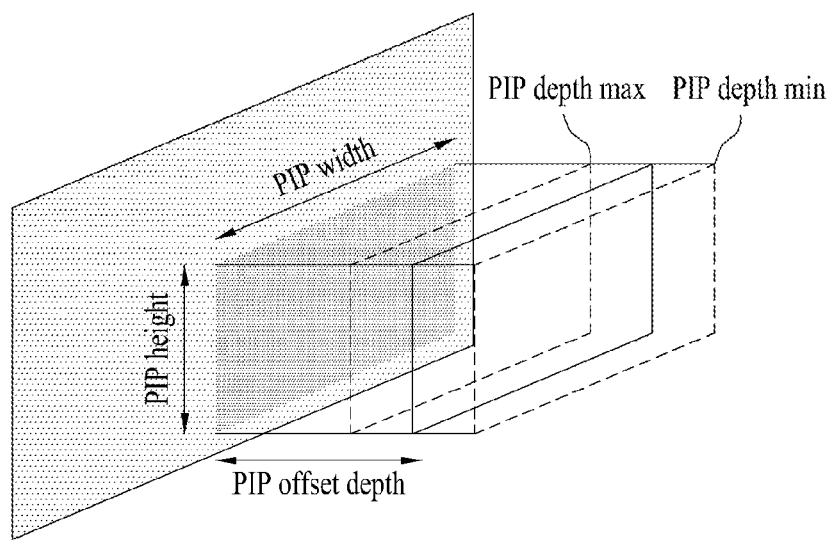
FIG. 15 is a view illustrating an example of PIP display parameters according to the present invention.

FIG. 15 is a view illustrating an example of PIP display parameters according to the present invention.

Referring to FIG. 15, the digital receiver may provide a 3D PIP service using the display parameters of FIGS. 12 to 14.

The size of a PIP region 1520 provided at a predetermined position of a display screen 1510 may refer to the PIP_width field and the PIP_height field.

Also, a PIP screen 1540 is provided between PIP_depth_max 1530 and PIP_depth_min 1550 from the display screen 1510 according to the PIP_offset_depth field.

Figure 16:
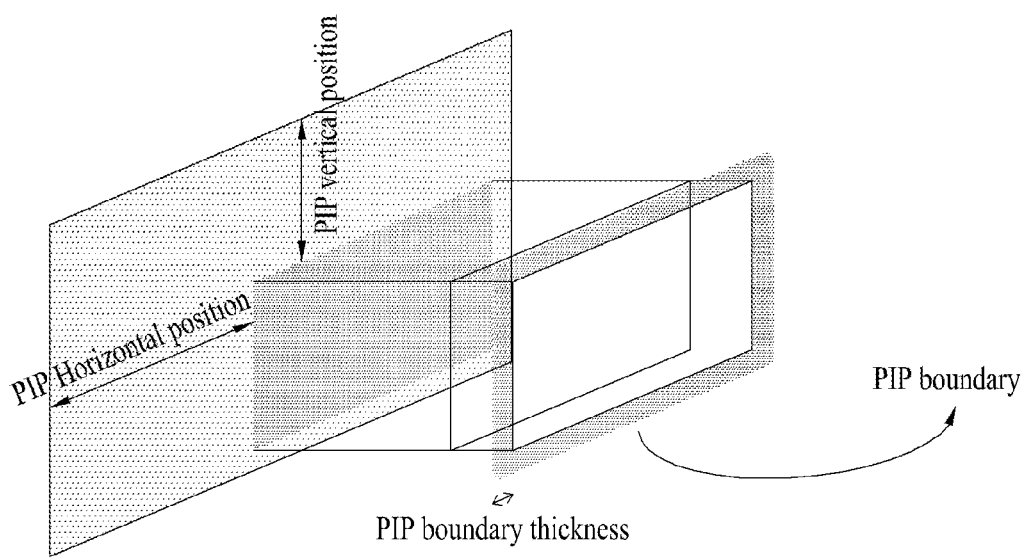
FIG. 16 is a view illustrating another example of PIP display parameters according to the present invention.

FIG. 16 is a view illustrating another example of PIP display parameters according to the present invention.

Referring to FIG. 16, the position of a PIP region 1620 provided on a display screen 1610 may be decided with reference to the PIP_Horizontal_position field and the PIP_vertical_position field.

In order to configure a PIP region in providing a PIP service, the digital receiver may provide position information obtained by referring to the PIP_Horizontal_position field and the PIP_vertical_position field of FIG. 16 and configure and provide a PIP screen on the display screen at various positions and sizes by referring to the PIP_width field and the PIP_height field of FIG. 15.

Meanwhile, as shown in FIG. 16, the PIP screen at the corresponding position may be configured with reference to a PIP_boundary_depth field and a PIP_boundary_thickness field.

Figure 17:
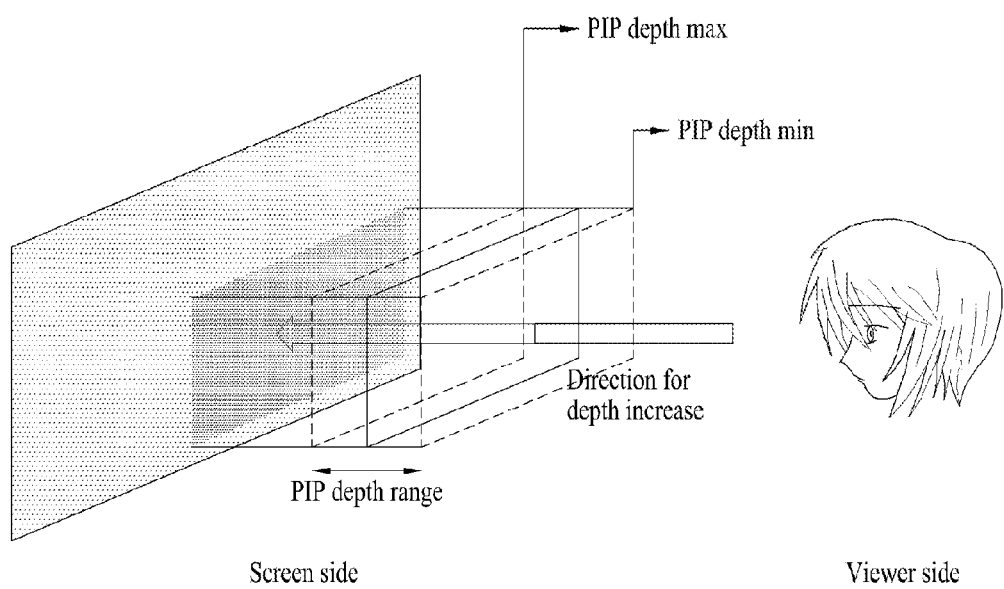
FIG. 17 is a view illustrating an example of PIP depth-related parameters according to the present invention.

FIG. 17 is a view illustrating an example of PIP depth-related parameters according to the present invention, and FIG. 18 is a view illustrating an example of parameters for 3D PIP realization according to the present invention.

FIG. 17 illustrates particularly PIP depth-related parameters. Depth is increased from a viewer side to a screen side.

Meanwhile, FIG. 18 shows a relationship between a PIP resolution size and a PIP depth range. The PIP resolution size and the PIP depth range may have different values in a symmetrical mode and in a non-symmetrical mode.

For example, in a case in which a PIP resolution size is 360×240, a PIP depth range may be −30 to +30 in a symmetrical mode and −10 to +50 in a non-symmetrical mode. In a case in which a PIP resolution size is 360×240, a PIP depth range may be −30 to +30 in a symmetrical mode and −10 to +50 in a non-symmetrical mode. In a case in which a PIP resolution size is 240×160, a PIP depth range may be −23 to +23 in a symmetrical mode and −7 to +45 in a non-symmetrical mode. In a case in which a PIP resolution size is 180×120, a PIP depth range may be −15 to +15 in a symmetrical mode and −4 to +40 in a non-symmetrical mode. In a case in which a PIP resolution size is 150×100, a PIP depth range may be −13 to +13 in a symmetrical mode and −1 to +35 in a non-symmetrical mode. In a case in which a PIP resolution size is 120×80, a PIP depth range may be −12 to +12 in a symmetrical mode and +2 to +30 in a non-symmetrical mode. In the above, the former is a PIP_depth_min value, and the latter is a PIP_depth_max value.

The above description is related to, for example, the ATSC method. On the other hand, definition may be slightly different in a DVB method. Hereinafter, the DVB method will be described in more detail. However, a detailed description of features identical to what has been given above will be omitted.

FIG. 19 is a view illustrating an example of Service Description Table (SDT) sections according to the present invention.

Referring to FIG. 19, when configuring an additional channel for a PIP, a service descriptor informs a 3D PIP 0 service through a service type. Meanwhile, in a case in which a base service is transmitted together with a PIP stream, information regarding a 3D PIP video component providing information regarding the PIP stream is included. FIG. 19 shows an SDT according to an embodiment of the present invention. The SDT describes services included in a specific transport stream in the DVB method.

Hereinafter, respective fields constituting the SDT table sections will be described in more detail with reference to FIG. 19.

A table_id field is an identifier to identify a table. For example, a specific value of the table_id field indicates that this section belongs to a service description table. A section_ syntax_indicator field is a 1 bit field and is set to 1. First two bits of a section_length field are set to 00. Byte number of a section including a CRC is indicated after this field. A transport_stream_id field serves as a label to distinguish Transport stream (TS). A version_number field indicates a version number of sub_table. Whenever a version number of sub_table is changed, the number of version_number field is increased by 1. A value of a current_next_indicator field is set to 1 when the sub_table is currently applicable. If a value of this field is set to 0, this means that this field is not yet applicable, and the next field is available. A section_number field indicates section number. The first section has a value of 0x00, and the value is incremented by 1 for each section having the same table_id, the same transport_stream_id, and the same original_network_id. A last_section_number field indicates the number of the last section (that is, the highest section number) of a corresponding sub_table, which is a portion of this section. An original_network_id field is a label to identify a network_id of the transmission system.

This SDT table sections describe a plurality of services. The respect services are signaled using the following fields.

A service_id field defines an identifier serving as a label to distinguish between services included in the TS. This field may have the same value as, for example, program_number of program_map_section.

In a case in which an EIT_schedule_flag field is set to 1, it indicates that EIT schedule information for a corresponding service is included in the current TS. On the other hand, in a case in which a field of this field is 0, this indicates that EIT schedule information is not included in the current TS.

In a case in which an EIT_present_following_flag field is set to 1, it indicates that EIT_present_following information for a corresponding service is included in the current TS. On the other hand, in a case in which a field of this field is 0, this indicates that EIT present/following is not included in the current TS.

A running_status field indicates status of a service.

In a case in which a free_CA_mode field is set to 0, it indicates that all elementary streams of a corresponding service are not scrambled. On the other hand, in a case in which the free_CA_mode field is set to 1, this indicates one or more streams are controlled by a Conditional Access (CA) system.

A descriptors_loop_length field indicates the total length of following descriptors in bytes.

A CRC_32 field indicates a CRC value, by which a register in the decoder has a zero output.

According to an embodiment of the present invention, it may be indicated that this service is a 3D broadcast service in a descriptor region following the descriptors_loop_length field through a service_type field included in a Service Descriptor of a DVB SI.

FIG. 20 is a view illustrating an example of configuration of a service_type field according to the present invention.

The service_type field of FIG. 20 is defined in a service_descriptor transmitted while being included in, for example, the SDT table sections of FIG. 19.

Particularly in a case in which a PIP stream of FIG. 20 is transmitted as an additional PIP stream, a 3D PIP service may be defined in the service_type field to signal it.

In a case in which a value of the service_type field of FIG. 20 is 0x01, it may indicate a digital television service. On the other hand, in a case in which a value of the service_type field of FIG. 20 is 0x06, it may indicate a mosaic service. In particular, in connection with the present invention, in a case in which a value of the service_type field is 0x11, it may indicate a frame-compatible 3DTV service. On the other hand, in a case in which a value of the service_type field is 0x12, it may indicate a 3D PIP service. In this case, the 3D PIP service transmits 3D PIP television programming including audio, video, and related 3D metadata.

Referring to FIG. 20, services may be configured as follows in consideration of linkage between a base service and a PIP service and lower compatibility with an existing receiver.

A base service and a PIP service are respectively defined and used. In this case, a service type for the PIP service may use a new value proposed in the present invention. Linkage between the two services may be achieved through a linkage descriptor, which will hereinafter be described. It is possible to configure a single service without configuration of an additional service. In this case, stream_content and component_type values may be assigned to an elementary stream (ES) for a PIP. As a result, the existing receiver may not recognize and ignore it such that the existing receiver provides a service without difficulty using a stream for a base service. A receiver supporting a PIP service may recognize such an additional PIP stream to provide the PIP service.

FIG. 21 is a view illustrating an example of configuration of a component_descriptor according to the present invention, and FIG. 22 is a view illustrating an example of configuration of a stream_content field and a component_type field of FIG. 21.

In a DVB, signaling is performed in a state in which the component_descriptor of FIG. 21 is added to a descriptor loop of the SDT table sections to indicate type of each elementary stream (ES) constituting a service. In the present invention, the stream_content and the component_type to distinguish a 3D PIP video for a 3D PIP service may be defined as shown in FIG. 22.

First, FIG. 21 shows a component descriptor according to the present invention.

Hereinafter, respective fields constituting the component_descriptor according to the present invention will be described with reference to FIG. 21.

A descriptor_tag field is a field to identify a corresponding descriptor and may have a value indicating that the corresponding descriptor is a component_descriptor.

A descriptor_length field provides information regarding the length of a corresponding descriptor.

A stream_content field indicates type of video, audio, or data included in a stream.

A component_type field indicates type of a video, audio, or data component.

A component_tag field is a field having the same value as a component_tag of a stream identifier descriptor.

An ISO 639-2 [3]_language_code field identifies language of a component or language of a text descriptor included this descriptor.

A text_char field identifies a text descriptor of a component stream.

This descriptor may be included in the SDT table sections and/or Event Information Table (EIT) sections of the DVB method.

Next, the stream_content and the component_type according to the present invention will be described in detail with reference to FIG. 22.

A stream_component indicates type of a stream. In the case of a MPEG-2 video, the stream_component is defined as 0x01. In case of a DVB subtitle, the stream_component is defined as 0x03. In case of an H.264 video, the stream_component is defined as 0x05.

A component type in this stream defines a frame-compatible 3D video and a 3D PIP video. In particular, the frame-compatible 3D video is a video component stream corresponding to a 3D base service, and a component type corresponding to the 3D PIP video may be additionally defined.

For example, in a case in which a value of the stream_content is 0x01 and a value of the component_type is 0x13, it may indicate that a 3D PIP video stream for a 3D stereoscopic video is coded in MPEG-2, and 24 frames are displayed per second.

Also, in a case in which a value of the stream_content is 0x01 and a value of the component_type is 0x14, it may indicate that a 3D PIP video stream for a 3D stereoscopic video is coded in MPEG-2, and 30 frames are displayed per second.

On the other hand, in a case in which a value of the stream_content is 0x05 and a value of the component_type is 0x13, it may indicate that a 3D PIP video stream for a 3D stereoscopic video is coded in AVC/H.264, and 25 frames are displayed per second.

Also, in a case in which a value of the stream_content is 0x05 and a value of the component_type is 0x14, it may indicate that a 3D PIP video stream for a 3D stereoscopic video is coded in AVC/H.264, and 30 frames are displayed per second.

FIG. 23 is a view illustrating an example of configuration of a 3D_PIP_video_descriptor according to the present invention.

Referring to FIG. 23, a 3D_PIP_video_descriptor_SDT is located at the position of a descriptor following a descriptors_loop_length field in the SDT table sections and includes information regarding a 3D PIP elementary stream.

A component_tag is used to indicate a linkage relationship between a component descriptor and an elementary stream (ES) on an ES_loop of a PMT. A component_tag field in a stream_identifier_descriptor may have the same value by an ES_Loop descriptor of the PMT to indicate a linkage relationship between a component_descriptor in the SDT and the 3D_PIP_video_descriptor_SDT.

Also, elements have a plurality of pieces of information through a loop in the 3D_complenentary_video_descriptor_SDT. The descriptor may be configured to include only information regarding an element without this loop. In this case, a plurality of 3D_complenentary_video_descriptor_SDT descriptors is included in the descriptor loop of the SDT to provide information regarding a plurality of elements.

The 3D_PIP_video_descriptor_SDT of FIG. 20 may be utilized as follows.

First, in a case in which a PIP is configured as an independent service, the 3D_PIP_video_descriptor_SDT may be included in the SDT of the independent PIP to identify a PIP stream. In a case in which the steam_content and the component_type are not additionally assigned for the PIP, the 3D_PIP_video_descriptor_SDT may be used to identify a PIP stream.

Next, in a case in which a base service is transmitted in a state in which a PIP stream is included in the base service, the 3D_PIP_video_descriptor_SDT may be added to the SDT to distinguish between a stream for the base service and the PIP stream.

The 3D_Display_Option_descriptor and/or the 3D_implementation_descriptor of FIGS. 12 to 14 may also be used to provide a PIP service through DVB transmission. The following flowchart shows the operation sequence of a receiver to provide a PIP service through an additional PIP stream using service type and stream identification information added for a PIP in the DVB and these descriptors.

Figure 24:
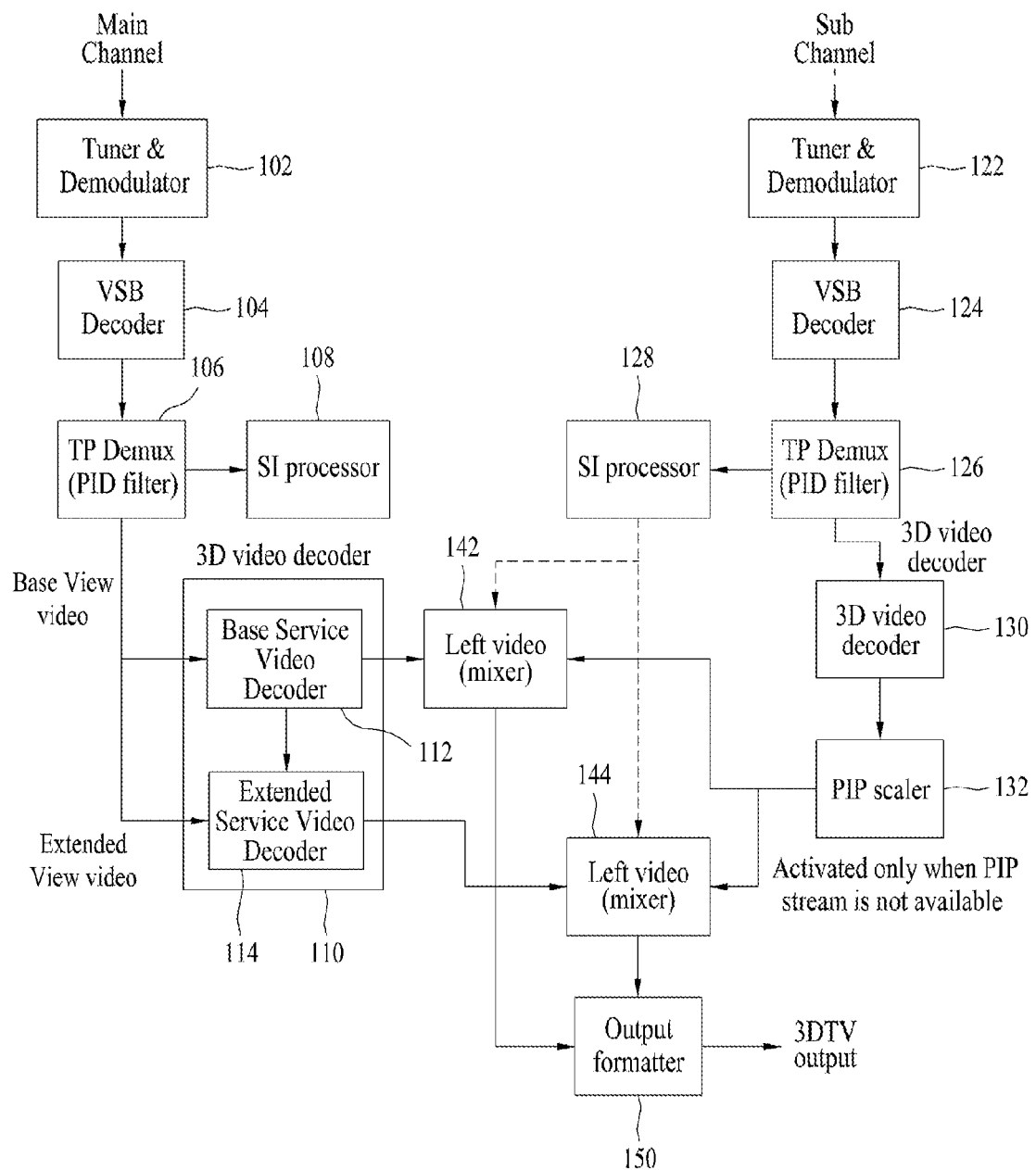
FIG. 24 is a view illustrating an example of configuration of a digital receiver to process a 3D signal according to the present invention.

FIG. 24 is a view illustrating an example of configuration of a digital receiver to process a 3D signal according to the present invention.

A digital receiver according to an embodiment of the present invention may include a first tuner and demodulator 102 to process a 3D service transmitted through a main channel, a second VSB decoder 104, a first TP demultiplexer (TP demux) 106, a first system information (SI) processor 108, and a first 3D video decoder 110. Also, the digital receiver according to the present invention may include a second tuner and demodulator 122 to process a 3D service transmitted through a sub channel, a second VSB decoder 124, a second TP demultiplexer 126, a second system information (SI) processor 128, and a second 3D video decoder 130. The 3D service provided through the main channel may be a 3D base service, and the 3D service provided through the sub channel may be a 3D PIP service. On the other hand, the 3D service provided through the main channel may be a 3D PIP service, and the 3D service provided through the sub channel may be a 3D base service. Also, the respective video decoders may include a base service decoder and/or an extended service decoder according to a corresponding service.

The digital receiver of FIG. 24 basically includes the multi-tuners and the components based thereon. However, one of the tuners may be activated only when, for example, an extended service is transmitted.

Hereinafter, the multi-tuners will be described as an example for easy understanding of the present invention and for the convenience of description; however, the digital receiver may includes a single tuner.

Hereinafter, the respective construction blocks of the digital receiver will be described with reference to FIG. 24.

The first tuner and demodulator 102 and/or the VSB decoder 104 receives and decodes a digital broadcast signal including service data and a signaling data to signal the service data. The VSB decoder 104 may be an OFDM decoder according to a broadcast mode.

The demultiplexer (TP demux) 106 demultiplexes video data, audio data, and signaling data from the digital broadcast signal through PID filtering and transmits the demultiplexed data to corresponding components. For example, the demultiplexed video data are transmitted to the video decoder 110, and the demultiplexed signaling data are transmitted to the system information processor 108.

The system information processor 108 parses the received signaling data and transmits the parsed signaling data to the video decoder 110 and/or a controller. At this time, the system information processor 108 may construct a database at the inside or outside thereof to temporarily store the parsed signaling data.

The 3D video decoder 110 performs decoding based on the signaling data transmitted from the controller or the system information processor 108. For a 3D base service, the demultiplexed and transmitted 3D video data are decoded through a base service video decoder. For a 3D extended service, on the other hand, the demultiplexed and transmitted 3D video data are decoded through an extended service video decoder. The base service video decoder 112 of the 3D video decoder 110 may function as a left view image data decoder 142, and the extended service video decoder 114 of the 3D video decoder 110 may function as a right view image data decoder 144.

The left view image data and the right view image data, which are the decoded data, are respectively processed by the left view image data decoder 142 and the right view image data decoder 144 and are output as a 3D video through an output formatter 150. Signaling information transmitted from the signaling information processor 108 may be used during this process.

The process of processing the 3D service transmitted through the main channel is performed as described above. In this case, the 3D service may be a base service.

On the other hand, the extended service may be transmitted through the sub channel.

In this case, as shown in FIG. 24, the process of processing the extended service transmitted through the sub channel may be performed in the same manner as above.

In this case, however, the 3D PIP service decoded by the 3D video decoder 130 is scaled by a PIP scaler 132 based on the above-mentioned signaling information according to the present invention.

Left view PIP data of the scaled 3D PIP data are transmitted to the left view image data decoder 142, and right view PIP data of the scaled 3D PIP data are transmitted to the right view image data decoder 144.

The left view image data decoder 142 mixes the left view image data of the 3D base service transmitted through the main channel and the 3D PIP left view data constituting the 3D PIP service transmitted through the sub channel and transmits the mixed data to the output formatter 150. In the same manner, the right view image data decoder 144 mixes the right view image data of the 3D base service transmitted through the main channel and the 3D PIP right view data constituting the 3D PIP service transmitted through the sub channel and transmits the mixed data to the output formatter 150.

The output formatter 150 outputs 3D video data through processing for a 3D service based on output frequency of a display unit. The output formatter 150 may perform video data processing, such as resizing, video formatting, and frame rate conversion, based on the signaling information.

Information regarding kind of a filter may be included in the resizing information. In this case, information regarding an attribute of a filter corresponding to the filter kind may be stored in the output formatter 150 or a storage medium (not shown).

In connection with the present invention, the digital receiver may refer to signaling information regarding format and configuration information of a 3D video stream for 3D service provision in the 3D virtual channel. This may be equally applied to both a 3D channel and a 3D PIP channel.

Also, in the above description, the digital receiver of FIG. 24 processes a PIP as an example. This configuration is not limited merely to PIP stream processing. In the digital receiver, this configuration may be used for preview on an EPG screen or channel browsing to simultaneously output a plurality of channels on one screen for channel selection.

A process of selecting and outputting a PIP channel in the digital receiver may be performed as follows.

For example, in a case in which an additional 3D PIP stream provision channel is present, and PIP channel connection information is provided in a corresponding 3D base channel, the digital receiver may signal information regarding a virtual channel, through which a 3D PIP stream for this channel is transmitted, using an additional descriptor for a 3D channel in the TVCT table sections.

Also, in a case in which the digital receiver signals a virtual channel, through which a 3D PIP service is transmitted, the digital receiver may use an Extended_Service_Descriptor (or service_linkage_descriptor) for the corresponding channel. That is, connection information between the 3D channel and the 3D PIP channel may be acquired through a descriptor for the 3D channel.

For example, it is assumed that a user is viewing channel 7-1 and wishes to view a video of channel 6-1 in the form of a PIP.

The digital receiver receives a 3DTV broadcast signal received through channel 6-1 using the second tuner.

At this time, the digital receiver reads an Extended_Service_Descriptor (or service_linkage_descriptor) in the TVCT table sections corresponding to channel 6-1 and checks information regarding a channel, through which a PIP stream is received, using information included therein.

On the assumption that a PIP channel for channel 6-1 is channel 6-2, the digital receiver parses a TVCT regarding channel 6-2 and checks a PID value of a video elementary stream (video ES) included in the PIP stream. Also, the digital receiver parses a 3D_PIP_display_option_descriptor and checks information regarding depth offset and boundary processing during PIP realization based on the parsed information.

The digital receiver decodes the checked video elementary stream through the second tuner. Afterwards, the digital receiver configures and outputs a PIP screen according to the checked PIP_depth_offset and boundary_style.

When the user wishes to view channel 6-1, which is provided in the form of a 3D PIP, on a full screen, the digital receiver outputs a video stream received through channel 6-1 to the full screen such that the user views a 3D video on the full screen.

Meanwhile, in a case in which an additional 3D PIP stream provision channel is present, and connection information of a corresponding 3D base channel is provided in the 3D PIP channel, the digital receiver may perform signaling using information regarding a 3D PIP stream on the 3D PIP channel in the TVCT table sections. In particular, the digital receiver may be connected to a channel having a 3D PIP service_type to directly receive a 3D PIP stream.

For example, it is assumed that a user is viewing channel 7-1 and wishes to view channel 6-1 in the form of a PIP.

The digital receiver parses TVCT table sections signaling a channel corresponding to channel 6-*x* and checks virtual channels, service_type of each of which is a 3D PIP channel, therefrom.

The digital receiver checks a channel number providing a 3D PIP service for channel 6-1 thereamong (6-2).

The digital receiver receives a 3DTV broadcast signal received through channel 6-2 using the second tuner.

The digital receiver parses TVCT table sections for the corresponding channel and acquires channel information having a 3D PIP service_type therefrom. The digital receiver acquires and/or (temporarily) stores a 3D PIP_display_option_descriptor and/or Base_Service_descriptor (or service_linkage_descriptor or Extended_Service_descriptor) of the 3D PIP channel.

At this time, on the assumption that a PIP channel is channel 6-2, the digital receiver performs PID filtering for an elementary A/V stream of a 3D PIP broadcast signal received through channel 6-2 using the second tuner and/or decodes a video/audio elementary stream.

The digital receiver configures and outputs a PIP screen of channel 6-2 on the screen of channel 7-1, which is being viewed, with reference to the PIP_depth_offset and the boundary_style.

When the user wishes to view channel 6-2, which is viewed in the form of a 3D PIP, on a full screen, the digital receiver receives a corresponding 3D channel through base service information of the Base_Service_descriptor (or service_linkage_descriptor and/or extended_service_descriptor).

At this time, connection of the 3D channel to the PIP or connection of the PIP to the 3D channel is possible according to the present invention.

Also, in a case in which the 3D channel provides 3D PIP realization information according to the present invention, and an additional PIP stream is not present, the digital receiver may decode descriptors containing information used to output this channel to the PIP in the 3D channel TVCT table sections and convert and output video content of a 3D base service for a PIP based on this information.

For example, it is assumed that a user is viewing channel 7-1 and requests to view a screen of channel 6-1 (providing information regarding conversion to a 3D PIP) on the current window in the form of a PIP.

The digital receiver receives a 3DTV broadcast signal received through channel 6-1 using the second tuner and acquires and/or stores 3D_PIP_Display_descriptor and/or 3D_PIP_implementation_descriptor information in the TVCT table sections corresponding to channel 6-1.

The digital receiver converts the 3DTV video stream received from channel 6-1 for a PIP in real time. At this time, the digital receiver may perform video size conversion and/or depth adjustment for conversion.

The digital receiver may configure and output the acquired 3D PIP screen on the screen of channel 7-1, which is being viewed, according to the PIP_depth_offset and boundary_style.

When the user wishes to view channel 6-1, which is viewed in the form of a 3D PIP, on a full screen, the digital receiver may output channel 6-1 to the full screen without conversion to a PIP.

The above description is based upon a method of configuring an additional PIP stream as an independent virtual channel and signaling a relationship between a base service channel and a PIP channel. In the present invention, another method of proving a PIP stream in a state in which the PIP stream is included in a virtual channel of a base service may be provided. In addition, a method of additionally assigning a stream_type to a stream for a PIP to distinguish between the stream for the PIP and an elementary stream (ES) of a base service or using private data, to which a value of 0x06 is assigned, may be considered.

Also, a 3D_PIP_Display_Option_Descriptor may be added to a descriptor_loop belonging to a PIP video stream of an ES loop of a PMT to provide additional information regarding output options of a PIP. The digital receiver may determine whether this descriptor is present to recognize that a corresponding ES is a stream for the PIP.

On the other hand, in a case in which a 3D PIP stream and a elementary stream are transmitted through a virtual channel, the digital receiver performs the following operation.

First, it is assumed that a user is viewing channel 7-1 and requests to view a video of channel 6-1 in the form of a PIP.

The digital receiver receives a 3DTV broadcast signal, which is received through channel 6-1, using the second tuner.

In a case in which an elementary stream (ES), stream_type of which is a 3D PIP, is present in a PMT corresponding to channel 6-1, the digital receiver may identify that this is a video elementary stream for a PIP. In a case in which the stream_type is used for a PIP stream having a value of 0x06, the digital receiver checks descriptor_loop of streams, stream_type of each of which is 0x06 to determine whether a 3D_display_option_descriptor is present. An elementary stream (ES) having this descriptor may be determined as a PIP stream.

At this time, the digital receiver may check information regarding depth_offset and boundary processing during PIP realization using a 3D_PIP_Display_option_descriptor belonging to a video elementary stream for the PIP.

Also, the digital receiver may decode the checked video elementary stream through the second tuner and configure and output a PIP screen according to the PIP_depth_offset and the boundary_style.

Also, in a case in which a PIP service is configured as an additional stream in a DVB method, the digital receiver performs the following operation.

The digital receiver may identify whether a 3D_PIP_service is provided in a corresponding service using a service_type field of a service_descriptor of an SDT. In this case, the presence of a PIP service linked to a base service may be signaled through a Linkage_descriptor, etc. Alternatively, it is possible for the receiver supporting the PIP to recognize that a 3D PIP service is being provided by checking the presence of a 3D_PIP_video_descriptor or a stream assigned for a 3D PIP while using the same service_type as a stereoscopic 3DTV service. Such a stream checking method may include a method of checking a stream_type or a component_type.

In order to output a PIP stream for a corresponding service, the digital receiver receives component_tag information regarding a PIP video component using a 3D_PIP_video_descriptor (Component_tag_PIP).

The digital receiver parses the 3D_PIP_Display_option_descriptor included in the SDT to check information regarding depth_offset and boundary processing.

The digital receiver finds a PMT having a program_number field, a value of which coincides with a value of the service_id field of the SDT and parses the PMT.

The digital receiver finds one, a value of a component_tag field of a stream_identifier_descriptor of an ES_descriptor loop of which is Component_tag_PIP, from elementary streams of the PMT and receives elementary_PID information of a 3D_PIP_video_component (PID_PIP).

The digital receiver decodes a 3D PIP video signal corresponding to the PID_PIP.

The digital receiver configures and outputs a PIP screen according to the PIP_depth_offset and the boundary_style.

The above description is based upon a process for the digital receiver to acquire the PID of the PIP video stream from the 3D_PIP_video_descriptor of the SDT table sections using the component_tag. In this process, as previously described, the stream type of each ES of the PMT may be checked, or the component type of the stream may be checked through the component_descriptor of the SDT table sections, to identify a corresponding stream. This is available when only one stream belonging to the corresponding stream type is present.

In connection with the present invention, the digital receiver may identify 3D video streams through the SDT table sections and receive detailed information regarding the respective 3D video streams through the descriptor included in the PMT. The latter case may be known through an SEI message.

The digital receiver identifies whether a corresponding channel provides a 3DTV service using the service_type field of the service descriptor of the SDT. Alternatively, the digital receiver may check whether a stream for a 3D service is included in a component of an elementary stream (ES) signaled through the component_descriptor of the SDT to check whether a 3DTV service is provided.

The digital receiver may identify that a corresponding elementary stream (ES) is a 3D video and/or 3D PIP service using information regarding a stream_content field and a component_type field signaled by the component_descriptor of the SDT.

The digital receiver finds a PMT having a program_number field, a value of which coincides with a value of the service_id field of the SDT and parses the PMT.

Figure 25:
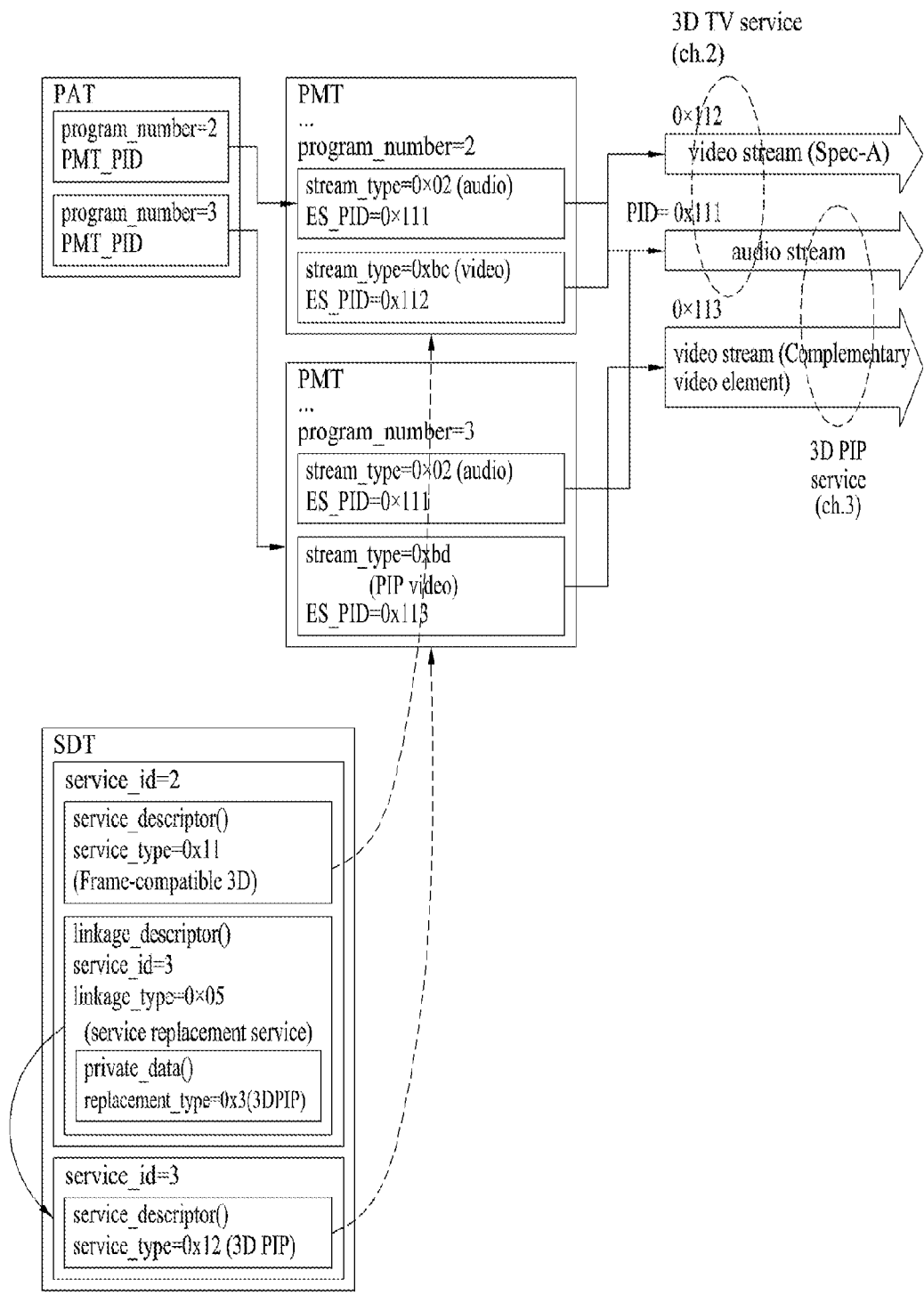
FIG. 25 is a view illustrating an example of 3D base service and 3D PIP service signaling according to the present invention.

FIG. 25 is a view illustrating an example of 3D base service and 3D PIP service signaling according to the present invention.

FIG. 25 shows an embodiment in which a corresponding 3D base service and a corresponding 3D PIP service are signaled using a linkage_descriptor according to the present invention. In this embodiment, it is assumed that the 3D base service and the 3D PIP service are present as different services.

Referring to FIG. 25, a PAT defines a program_number value and a PMT_PID of a corresponding program. The digital receiver extracts and parses a PMT based on the program_number value and the PMT_PID.

In connection with the 3D base service, in a case in which the program_number is 2, and the stream_type of a corresponding program is 0x02, the PMT may indicate an audio elementary stream and that a PID of the audio elementary stream is 0x111. On the other hand, in a case in which the program_number is 2, and the stream_type of a corresponding program is 0xbc, the PMT may indicate a video elementary stream and that a PID of the video elementary stream is 0x112. This 3D base service is transmitted through channel 2.

In connection with the 3D PIP service, on the other hand, in a case in which the program_number is 3, and the stream_type of a corresponding program is 0xbd, the PMT may indicate an video elementary stream for a 3D extended service, such as a 3D PIP service. In this case, the PMT may indicate that a PID of the video elementary stream is 0x113. This 3D extended service is transmitted through channel 3.

In conclusion the digital receiver not only identifies a corresponding service through the PAT and the PMT but also extracts and processes an audio and/or video elementary stream for the corresponding service.

In the above, the SDT may be mapped with the program_number of the PMT through the service_id to signal the type of a corresponding service. For example, the PMT may map audio and/or video elementary streams related to one service, i.e. a 3D base service or a 3D PIP service, through the program_number and the stream_type and check whether a combination of the elementary streams is a 3D base service or a 3D PIP service from the SDT value.

In a case in which a service_id of the SDT is 2, it may correspond to the program_number 2 of the PMT, and the service_descriptor in the SDT may define the service_type as 0x11 (Frame-Compatible 3D) to signal that it is a 3D service. On the other hand, in a case in which a service_id is 2 and a linkage_type is 0x05 through the linkage_descriptor, this may indicate that it is a service_replacement_service, and a 3D PIP may be indicated through a private_data( ) and a replacement_type (0x03) to signal the presence and processing of a 3D service corresponding to the service_id 2. In a case in which a service_id is 3, the service_descriptor may define the service_type as 0x12 to signal that it is a 3D PIP service in the same manner.

In connection with this case, a relationship between the replacement_type and a service is defined as indicated in Table 1 to identify type of the replacement service.

TABLE 1

| Replacement_type | Type of replacement service |
| --- | --- |
| 0x00 | HD simulcast |
| 0x01 | SVC |
| 0x02 | 3D stereoscopic |
| 0x03 | 3D PIP |
| 0x04-0xff | Reserved for use |

In a case in which the value of the replacement_type field is 0x00, type of the replacement service is HD simulcast. In a case in which the value of the replacement_type field is 0x01, type of the replacement service is SVC. In a case in which the value of the replacement_type field is 0x02, type of the replacement service is 3D stereoscopic. In a case in which the value of the replacement_type field is 0x04, type of the replacement service is 3D PIP.

Figure 26:
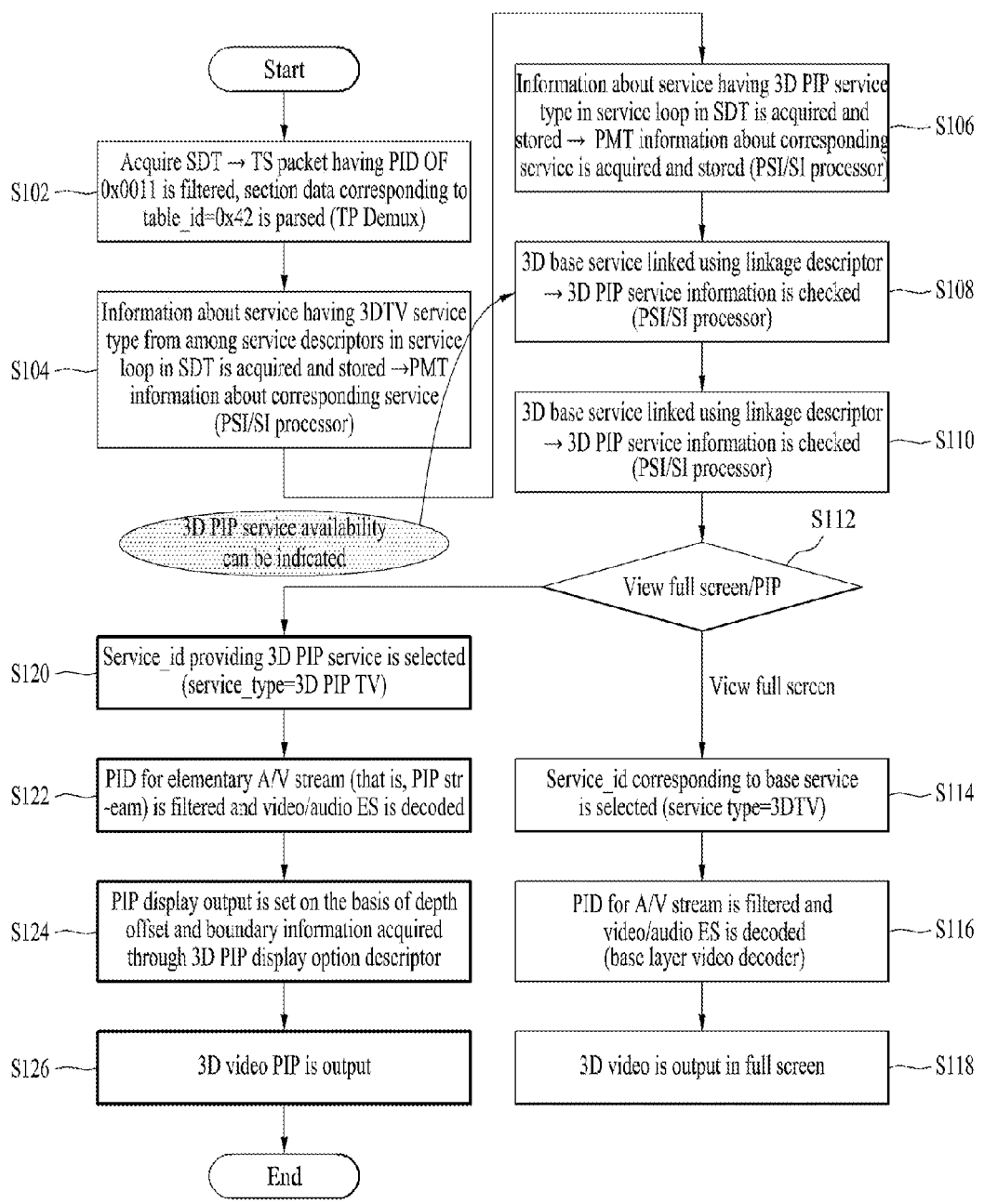
FIG. 26 is a flowchart illustrating an example of outputting a stereoscopic video signal using 3D signaling information according to the present invention.

FIG. 26 is a flowchart illustrating an example of outputting a stereoscopic video signal using 3D signaling information according to the present invention.

The demultiplexer filters and parses SDT sections from a received digital broadcast signal. As previously described, the demultiplexer filters the SDT sections through PID filtering. At this time, the PID may be set to, for example, 0x0011, and the demultiplexer may filter a TS packet having a corresponding PID to parse section data having a table_id=0x42 (S102).

The signaling information processor acquires and stores information regarding a service having a 3D service type from among service descriptors in a service loop in the parsed SDT. At this time, the signaling information processor acquires and stores PMT information regarding a 3D service (S104).

The signaling information processor acquires and stores information regarding a service having a 3D PIP service type in the service loop in the parsed SDT. That is, the signaling information processor acquires and stores PMT information regarding a 3D PIP service (S106).

The signaling information processor parses a linkage_descriptor from the signaling information and checks information regarding a 3D base service id linked using the information of the parsed linkage_descriptor (S108). In this case, the digital receiver may display availability of a 3D PIP service through a broadcast guide, such as an EPG.

The signaling information processor checks PID information regarding a 3D PIP video stream using the PMT information regarding the 3D PIP service (S110).

The digital receiver allows a view mode, i.e. a full screen view mode or a PIP view mode, to be set (S112).

The following two operations are performed according to the view mode. First, a case in which the full screen view mode is set will be described.

The digital receiver selects a service_id providing a 3D base service (S114). At this time, the service_type of the service_id may be, for example, 3DTV.

The digital receiver filters a PID for an elementary A/V stream and decodes a video/audio elementary stream (S116).

The controller controls 3D video data decoded by the output formatter to be output on a full screen using 3D_Service_Descriptor information (S118).

Next, a case in which the 3D PIP view mode is set will be described.

The digital receiver selects a service_id providing a 3D PIP video (S120). A value of a service_type field of a channel having the service_id may indicate, for example, 3D PIP channel.

The controller controls the demultiplexer and the decoder to filter a PID for an elementary A/V stream, i.e. a 3D PIP stream, and decode a video/audio elementary stream (S122).

The controller sets a PIP display output using depth_offset and boundary information acquired through a 3D_PIP_Display_option_descriptor (S124).

The controller outputs the decoded 3D PIP video data (S126).

Figure 27:
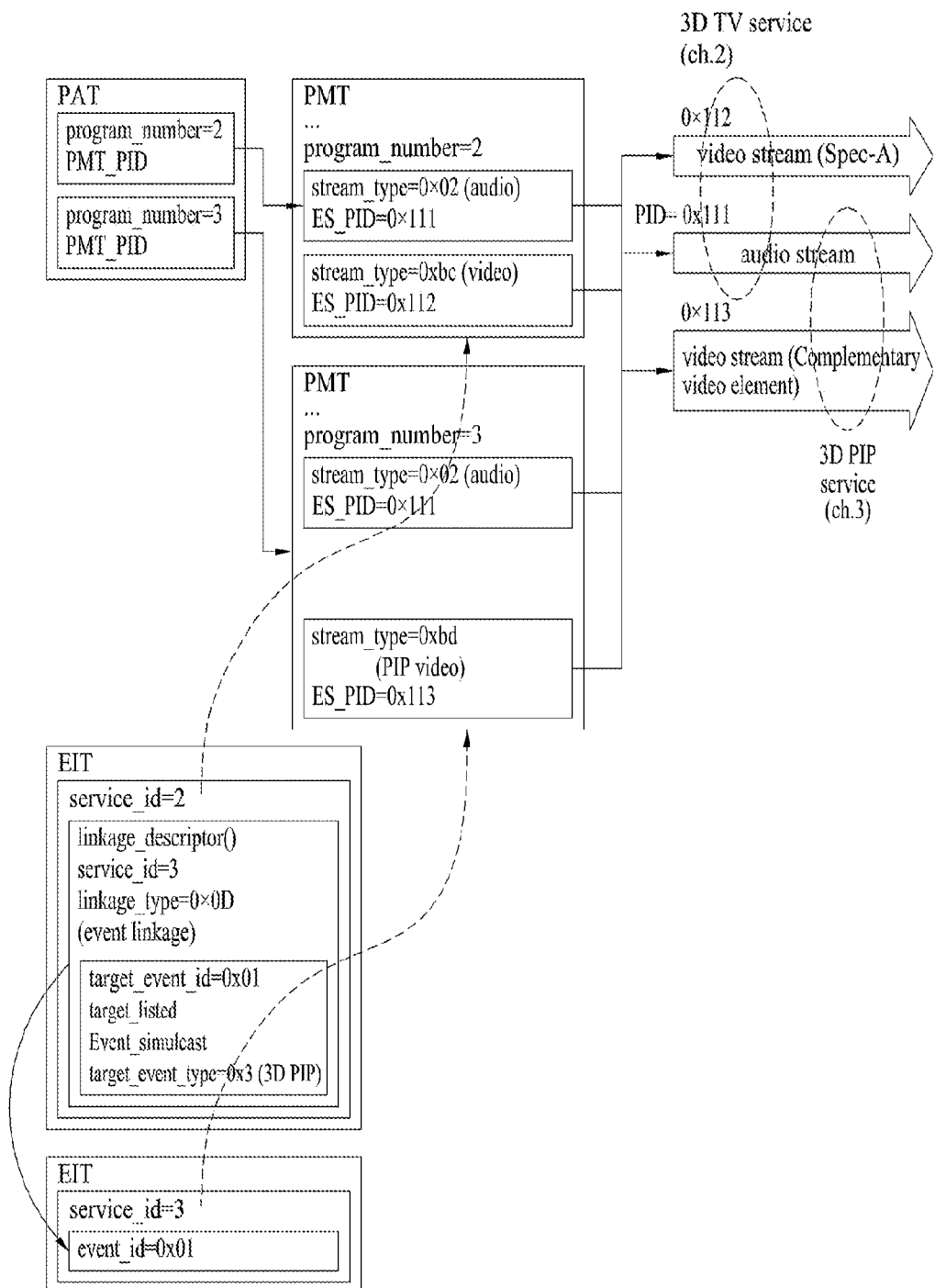
FIG. 27 is a view illustrating an example of corresponding 3D base service event and 3D PIP service event signaling according to the present invention.

FIG. 27 is a view illustrating an example of corresponding 3D base service event and 3D PIP service event signaling according to the present invention.

Referring to FIG. 27, linkage information between a 3D base service event and a 3D PIP service event corresponding to each other using, for example, linkage_descriptor. At this time, the 3D base service event and the 3D PIP service event may be present as events of different services.

A basic relationship of this example is identical to the relationship among the PAT, the PMT, and the SDT of FIG. 25 except that an EIT is used in place of the PMT in FIG. 27.

Referring to FIGS. 25 and 27, the EIT is linked to each program of the PMT using a service_id. The EIT also includes a linkage_descriptor. Consequently, the EIT identifies an event_linkage through a service_id and a linkage_type in the linkage_descriptor and signals information regarding an event through a target_event_id therein.

This may indicate that id of a target event of a 3D base service is 0x01, and, in a case in which a value of a target_event_type field is 0x03 with reference to Table 1, this may indicate a 3D PIP service event. The value of the target_event_type field may be defined, for example, in the same manner as in Table 1. In this case, only item names are different.

Figure 28:
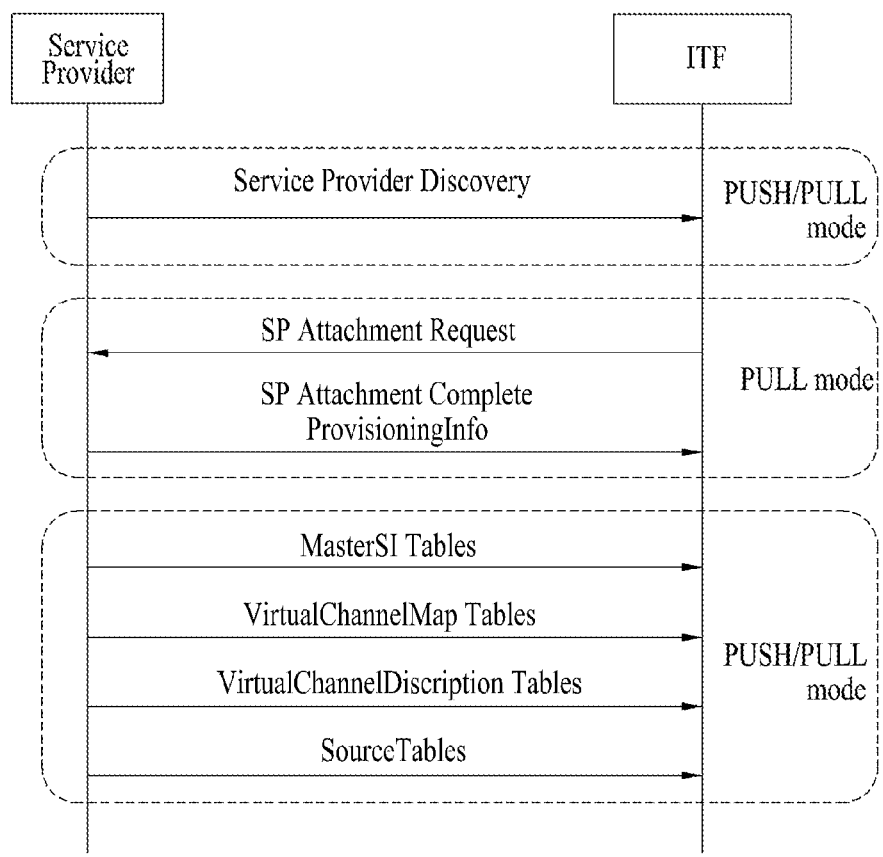
FIG. 28 is a view illustrating an IPTV service search process according to the present invention.

Alternatively, the EIT may be linked to the PMT through the service_id and the event_id to directly identify a 3D PIP service event. FIG. 28 is a view illustrating an IPTV service search process in connection with the present invention. FIG. 28 is a view illustrating a 3D service acquisition process in an IPTV according to an embodiment of the present invention An IPTV Terminal Function (ITF) is a push/pull mode, in which information for Service Provider Discovery is received from service providers. The Service Provider Discovery is a process of service providers who provide an IPTV finding a server providing information regarding services of the service providers. For example, the Service Provider Discovery provides a service provision server for each service provider as follows. That is, the receiver finds an address list, from which information regarding Service Discovery (SD) Servers (SP discovery information) is received, as follows.

In an embodiment, the receiver receives Service Provider (SP) Discovery information from an automatically or manually preset address. At this time, the receiver may receive corresponding information from an address preset in the ITF, or a user may manually set a specific address such that the receiver receives SP Discovery information desired by the user.

In another embodiment, the receiver may perform SP Discovery based on a DHCP. That is, the receiver may obtain SP Discovery information using a DHCP option.

In a further embodiment, the receiver may perform SP Discovery based on a DNS SRV. That is, the receiver may obtain SP Discovery information through a query using a DNS SRV mechanism.

The receiver accesses a server having an address acquired using the above method to receive information including Service Provider Discovery Record containing information necessary for Service Discovery of a Service Provider (SP). The receiver performs a service search process through the information including the Service Provider Discovery Record. Data related to the Service Provider Discovery may be provided in a push mode or in a pull mode.

The receiver accesses an SP Attachment Server of a Service Provider access address (for example, an address designated as SPAttachmentLocator) based on the information of the SP Discovery record to perform an ITF registration procedure (Service Attachment procedure). At this time, information transmitted from the ITF to the server may be transmitted in the form of, for example, an ITFRegistrationInputType record, and the ITF may provide this information in the form a query Term of an HTTP GET method to perform Service Attachment.

In an embodiment, the receiver may selectively access an Authentication service server of an SP designated as SPAuthenticationLocator to perform an additional authentication procedure and then perform Service Attachment. In this case, the receiver may transmit ITF information in a form similar to that in the case of the Service Attachment to perform authentication.

The receiver may receive data in the form of ProvisioningInfoTable from the service provider. This procedure may be omitted.

The receiver contains ID and position information of the receiver in data to be transmitted to the server during a Service Attachment procedure of an ITFRegistrationInputType record. The Service Attachment server may specify a service subscribed to by the receiver based on the information provided by the receiver. The Service Attachment server may provide a Service Information acquirable address, which is to be received by the receiver, in the form of ProvisioningInfoTable based thereupon. For example, this address may be used as access information of a MasterSI Table. This method has an effect of configuring and providing a customized service for each subscriber.

The receiver may receive a VirtualChannelMap Table, a VirtualChannelDescription Table, and/or a SourceTable based on the information received from the service provider.

The VirtualChannelMap Table provides a Master SI Table Record administrating access information and version regarding VirtualChannelMap and a service list in the form of a package. The VirtualChannelDescription Table contains detailed information of each channel. The SourceTable contains access information, based on which a real service is accessed. The VirtualChannelMap Table, the VirtualChannelDescription Table and the SourceTable may be classified as service information. Such service information may further include information of the above descriptors. In this case, however, the form of the information may be changed so as to be suitable for a service information scheme of the IPTV.

Figure 29:
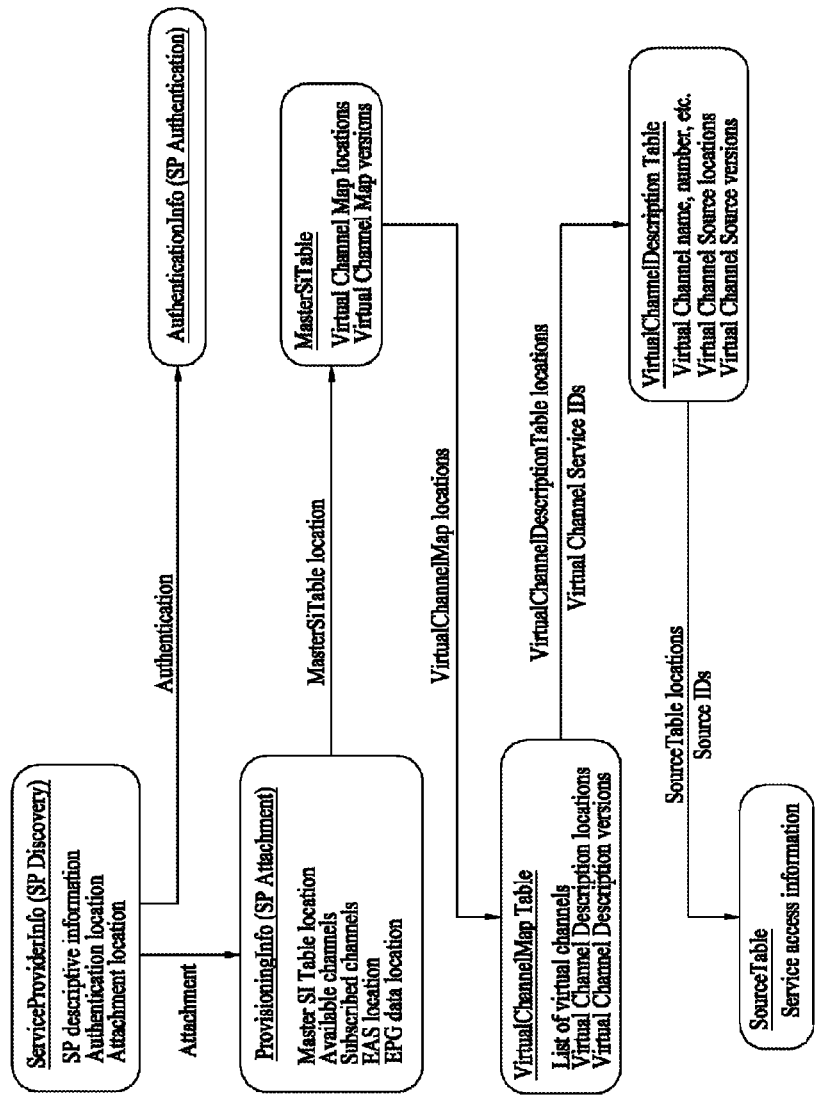
FIG. 29 is a view illustrating an IPTV service SI table and a relationship among components thereof according to the present invention.

FIG. 29 is a view illustrating an IPTV service SI table and a relationship thereof according to the present invention.

FIG. 29 is a view showing the structure of Service Information (SI) table for an IPTV according to an embodiment of the present invention.

FIG. 29 shows Service Provider discovery, attachment metadata components, and Services Discovery metadata components and a relationship thereamong. The receiver may process received data according to procedures indicate by arrows shown in FIG. 29.

ServiceProviderInfo includes SP descriptive information, which is information related to a service provider, Authentication location, which is information regarding a location providing information related to authentication, and Attachment location, which is information related to an attachment location.

The receiver may perform authentication related to a service provider using the Authentication location information.

The receiver may access a server capable of receiving ProvisioningInfo using information included in the Attachment location. ProvisioningInfo may include a Master SI Table location including a server address capable of receiving a Master SI Table, an Available channel including information regarding channels that can be provided to a viewer, a Subscribed channel including information regarding subscribed channels, a Emergency Alert System (EAS) location including information related to emergency alert, and/or a Electronic Program Guide (EPG) data location including position information related to an EPG. In particular, the receiver may access an address capable of receiving the Master SI Table using the Master SI Table location information.

A Master SI Table Record contains position information capable of receiving VirtualChannelMaps and version information of the VirtualChannelMaps.

A VirtualChannelMap is identified by a VirtualChannelMapIdentifier, and a VituralChannelMapVersion has version information of the VirtualChannelMap. In a case in which one of the tables connected in arrow directions starting from a MasterSITable is changed, such change results in the increase in version number of a corresponding table and the increase in version number of all high-ranking tables (up to the MasterSITable). Consequently, it is possible to immediately check the change in all SI tables by monitoring the MasterSITable. For example, in a case in which change occurs in a SourceTable, this change results in the increase the version of the SourceTable, i.e. a SourceVersion. Also, this change results in change of a VirtualChannelDescriptionTable including reference for the SourceTable. In this way, change of the lower-ranking tables results in change of the upper-ranking tables, and finally, change of the MasterSITable.

Only one MasterSITable may be present for a service provider. However, in a case in which service configuration is different for each region or for each subscriber (or each subscriber group), it may be efficient to configure an additional MasterSITable Record in order to provide a customized service for each unit. In this case, it may be possible to provide a customized service suitable for region and subscription information of a subscriber through the MasterSITable by performing a Service Attachment step.

The MasterSITable Record provides a list of VitrualChannelMaps. The VitrualChannelMaps may be identified by VirtualChannelMapIdentifiers. Each VitrualChannelMap may have one or more VirtualChannels and designates a position capable of obtaining detailed information regarding VirtualChannels. A VirtualChannelDescriptionLocation serves to designate a location of a VirtualChannelDescriptionTable containing detailed information of channels.

The VirtualChannelDescriptionTable contains detailed information of VirtualChannels and may access a location capable of providing corresponding information to the VirtualChannelDescriptionLocation of the VirtualChannelMap.

A VirtualChannelServiceID is included in the VirtualChannelDescriptionTable and serves to identify a service corresponding to a VirtualChannelDescription. The receiver may find the VirtualChannelDescriptionTable through a VirtualChannelServiceID. In a case in which the receiver receives a plurality of VirtualChannelDescriptionTables in a multicast mode, the receiver finds the VirtualChannelDescriptionTable identified by a specific VirtualChannelServiceID while joining to a corresponding stream to continuously receive tables.

In case of a unicast mode, the receiver may transmit the VirtualChannelServiceID to the server as a parameter to receive only a desired VirtualChannelDescriptionTable.

A SourceTable provides access information (for example, IP address, port, AV codec, transmit protocol, etc.) necessary to access a real service and/or source information for each service. Since one source may be utilized for several VirtualChannel services, it may be efficient to individually provide source information for each service.

The MasterSITable, the VirtualChannelMapTable, the VirtualChannelDescriptionTable, and the SourceTable are logically transmitted through four separate flows. A push mode or a pull mode may be unlimitedly used.

However, the MasterSITable may be transmitted in a multicast mode for version administration, and the receiver may continuously receive a stream transmitting the MasterSITable to monitor version change.

Figure 30:
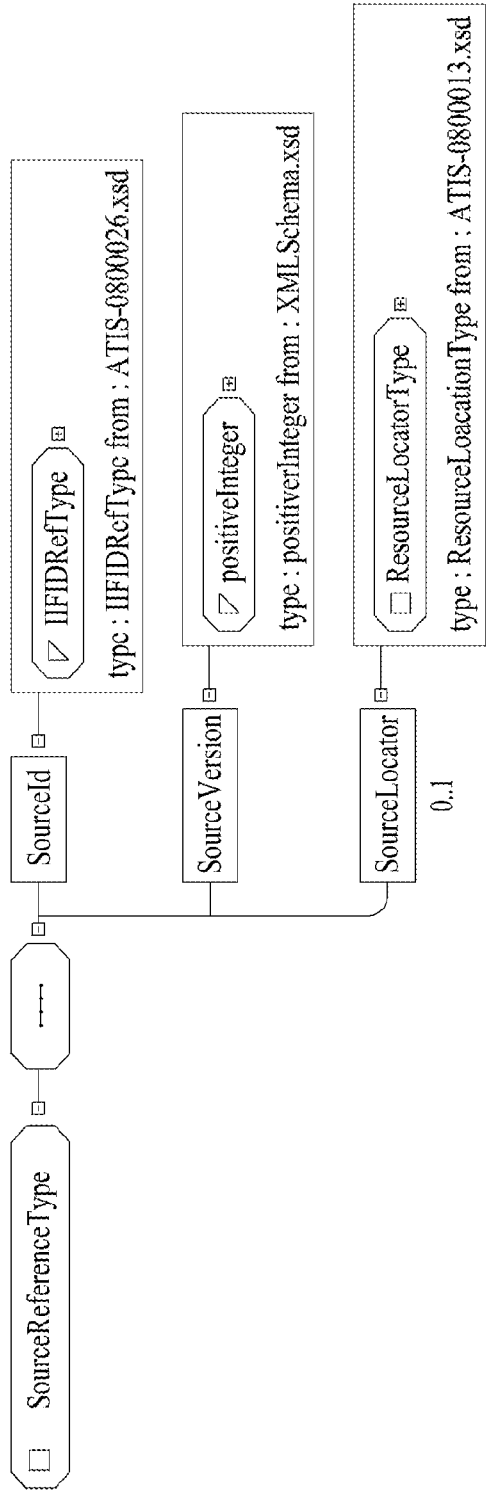
FIG. 30 is a view illustrating an example of a SourceReferenceType XML schema structure according to the present invention.

FIG. 30 is a view illustrating an example of a SourceReferenceType XML schema structure according to the present invention.

FIG. 30 is a view showing an XML schema of a SourceReferenceType according to an embodiment of the present invention.

The XML schema of the SourceReferenceType according to the embodiment of the present invention is a structure to reference a source element containing media source information of a Virtual Channel Service.

The SourceReferenceType includes SourceId, SourceVersion, and/or SourceLocator information.

The SourceId is an identifier of the referenced Source element.

The SourceVersion is a version of the referenced Source element.

The SourceLocator provides a location capable of receiving a Source Table including the Source element. In an embodiment, in a case in which a DefaultSourceLocator and this element are simultaneously present, this element overrides a default value.

Figure 31:
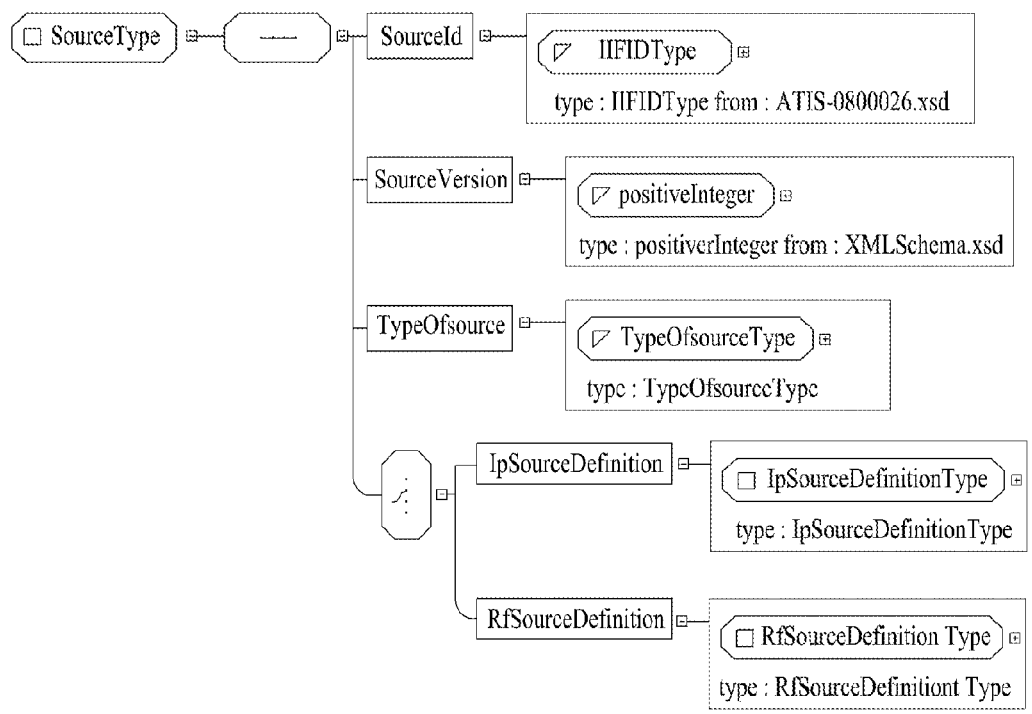
FIG. 31 is a view illustrating an example of a SourceType XML schema structure according to the present invention.

FIG. 31 is a view illustrating an example of a SourceType XML schema structure according to the present invention.

FIG. 31 is a view showing an XML schema of a SourceType according to an embodiment of the present invention.

In an embodiment, the XML schema of the SourceType according to the present invention contains information necessary to acquire a media source of a VirtualChannelService.

The SourceType includes SourceId, SourceVersion, TypeOfSource, IpSourceDefinition, and/or RfSourceDefinition information.

The SourceId is an identifier of the referenced Source element. In an embodiment, it is necessary for this identifier to uniquely identify this Source element.

The SourceVersion is a version of the referenced Source element. In an embodiment, it is necessary for a value to be increased whenever content of the Source element is changed.

The TypeOfSource is a value indicating characteristics of a corresponding Source. A concrete embodiment of this value will be described with reference to FIG. 32.

In an embodiment, a Barker channel is a channel for advertisement or public information. When viewing a corresponding channel is not authorized with the result that viewing of the corresponding channel is not possible, automatic selection to this channel is performed such that this channel serves to publicize the corresponding channel and introduce subscription of the corresponding channel.

The IpSourceDefinition provides access information of a media source transmitted through an IP network. In an embodiment, the IpSourceDefinition may inform a Multicast IP address, a transmit protocol, and/or various parameters.

The RfSourceDefinition may provide access information of a media source transmitted through a cable TV network.

FIG. 32 is a view illustrating an example of a TypeOfSourceType XML schema structure according to the present invention.

FIG. 32 is a view showing a TypeOfSourceType XML Schema extended to signal information regarding a video image for a 3D PIP service according to an embodiment of the present invention.

In FIG. 32, a TypeOfSource value indicating characteristics of a corresponding Source is defined. HD, SD, PIP, SdBarker, HdBarker, PipBarker, 3D HD, 3D SD, and 3D PIP according to the present invention may be indicated based on the value. In the above, a Barker channel is a channel for advertisement or public information. When viewing a corresponding channel is not authorized with the result that viewing of the corresponding channel is not possible, automatic selection to this channel is performed such that this channel serves to publicize the corresponding channel and introduce subscription of the corresponding channel.

Figure 33:
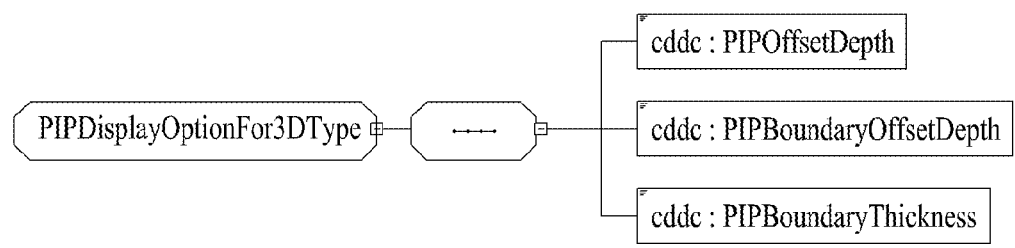
FIG. 33 is a view illustrating an example of a PIPDisplayOptionFor3DType XML schema structure according to the present invention.

FIG. 33 is a view illustrating an example of a PIPDisplayOptionFor3DType XML schema structure according to the present invention, and FIG. 34 is a view illustrating another example of a PIPDisplayOptionFor3DType XML schema structure according to the present invention.

FIGS. 33 and 34 illustrate elements and types of option values for 3D PIP display according to the present invention.

In the PIPDisplayOptionFor3DType XML schema structure, for example, three elements are illustrated as previously described.

The definition and attribute of each element of FIGS. 33 and 34 may be equal to, for example, the field values of FIG. 12. That is, FIGS. 33 and 34 define FIG. 12 in the form of an XML schema.

Figure 35:
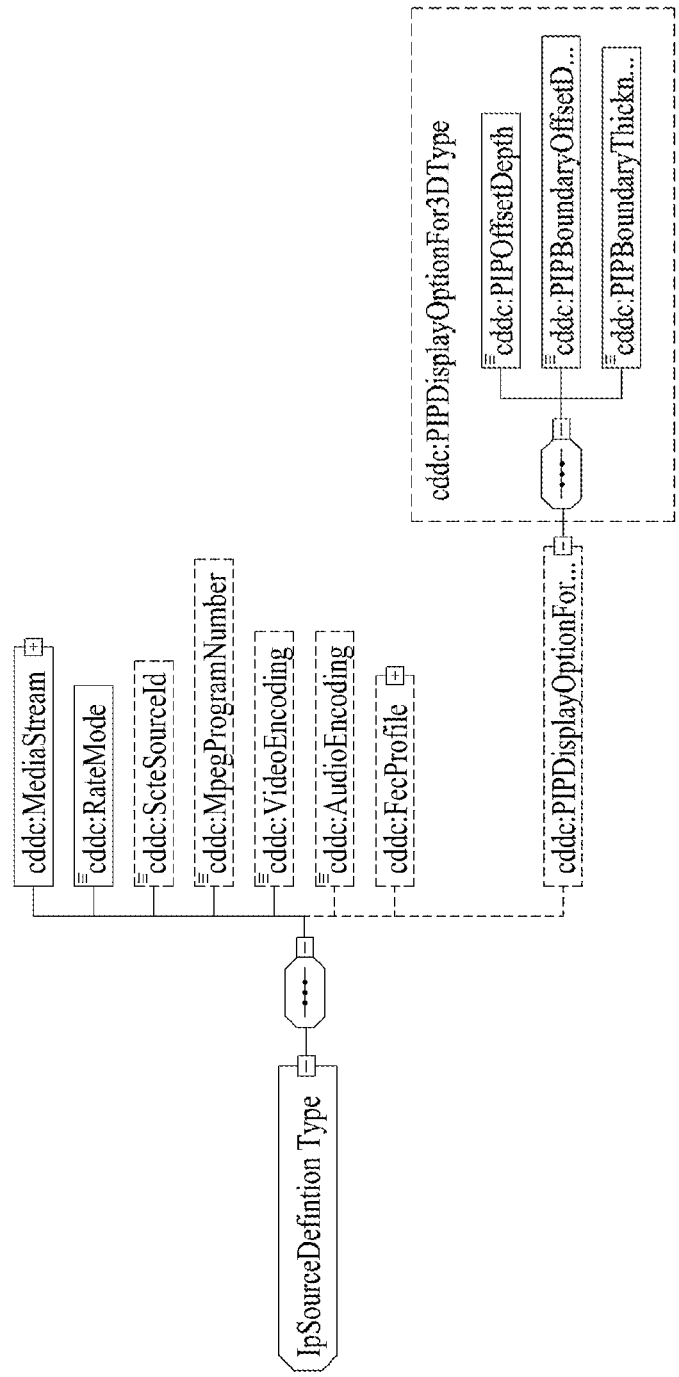
FIG. 35 is a view illustrating an example of an IpSourceDefinitionType XML schema structure according to the present invention.

FIG. 35 is a view illustrating an example of an IpSourceDefinitionType XML schema structure according to the present invention.

For example, FIG. 35 configures a PIPDisplayOptionFor3DType value according to the present invention in the form of a XML schema in an IpSourceDefinitionType value.

An IpSourceDefinition Type includes a MediaStream element, a RateMode element, a ScteSourceId element, a MpegProgramNumber element, VideoEncoding and AudioEncoding elements (codec elements), a FecProfile element, and a PIPDisplayOptionFor element.

The MediaStream element includes an IP multicast session description for a media stream of this source. This media stream element includes an asBandwidth attribute. The asBandwidth attribute may be expressed in kilobits per second. Interpretation of the asBandwidth attribute is the maximum bit rate.

The RateMode element includes a programming source rate type. For example, the RateMode element may include Constant Bit Rate (CBR) or Variable Bit Rate (VBR).

The ScteSourceId element may include a Source ID of an MPEG-2 TS.

The MpegProgramNumber element may include a MPEG Program Number.

The VideoEncoding element indicates a video encoding format of a media source.

The AudioEncoding element may indicate a description regarding audio coding used in a programming source in an audio MIME type form registered in an IANA.

The FecProfile element indicates an IP FEC Profile in a possible case.

The elements shown in FIGS. 33 and 34 are included as sub elements of the PIPDisplayOptionFor element in the IpSourceDefinition Type.

In the above, the codec elements may define a 3D PIP service as well as a 3D base service.

Figure 36:
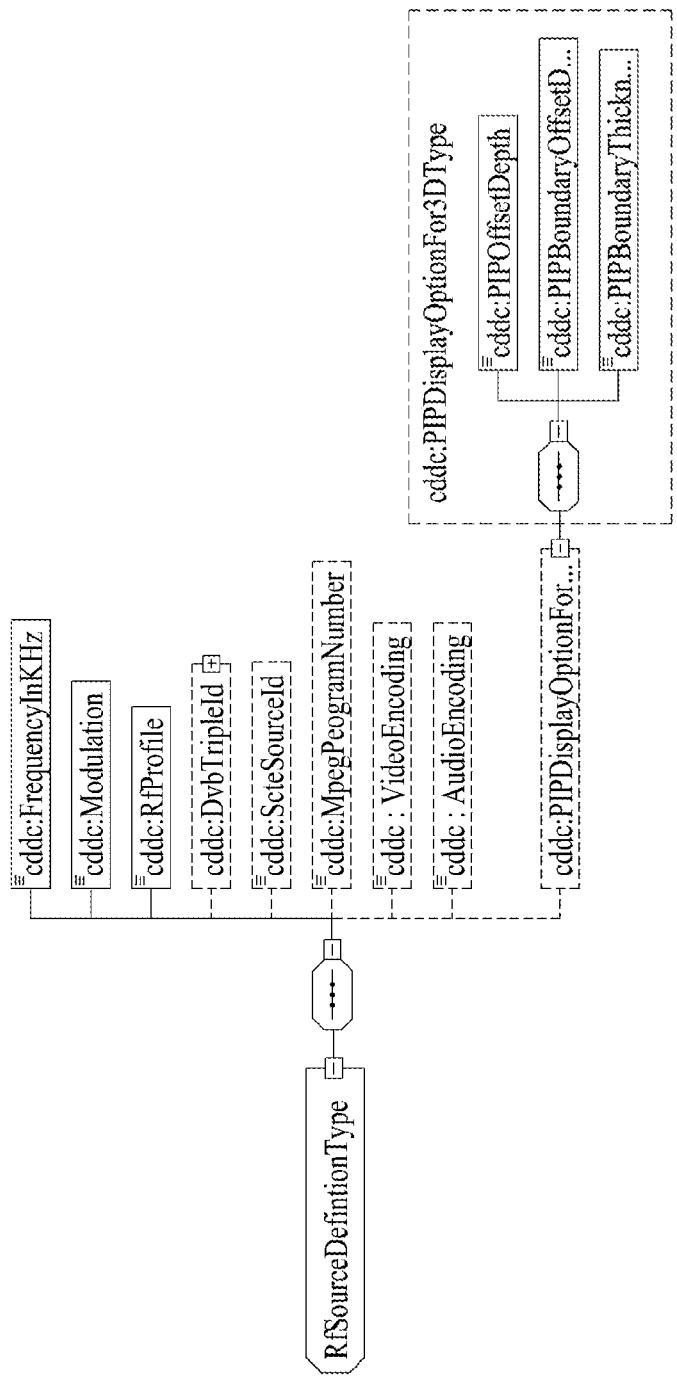
FIG. 36 is a view illustrating an example of a RfSourceDefinitionType XML schema structure according to the present invention.

FIG. 36 is a view illustrating an example of a RfSourceDefinitionType XML schema structure according to the present invention.

FIG. 36 illustrates a RfSourceDefinitionType XML schema structure. A detailed description of definition and content of each element identical to that of FIG. 35 will be omitted.

In FIG. 36, an RfSourceDefinitionType includes a FrequencyInKHz element, a Modulation element, an RfProfile element, and a DvbTripleId element according to characteristics thereof.

The FrequencyInKHz element indicates an RF frequency of a source in KHz. This indicates a central frequency irrespective of a modulation type.

The Modulation element indicates a RF modulation type. For example, NTSC, QAM-64, QAM-256, or 8-VSB may be indicated.

The RfProfile element may indicate an elementary stream type. For example, SCTE, ATSC, or DVB may be indicated.

The DvbTripleId element indicates a DVB Triplet identifier for a broadcast stream.

Figure 37:
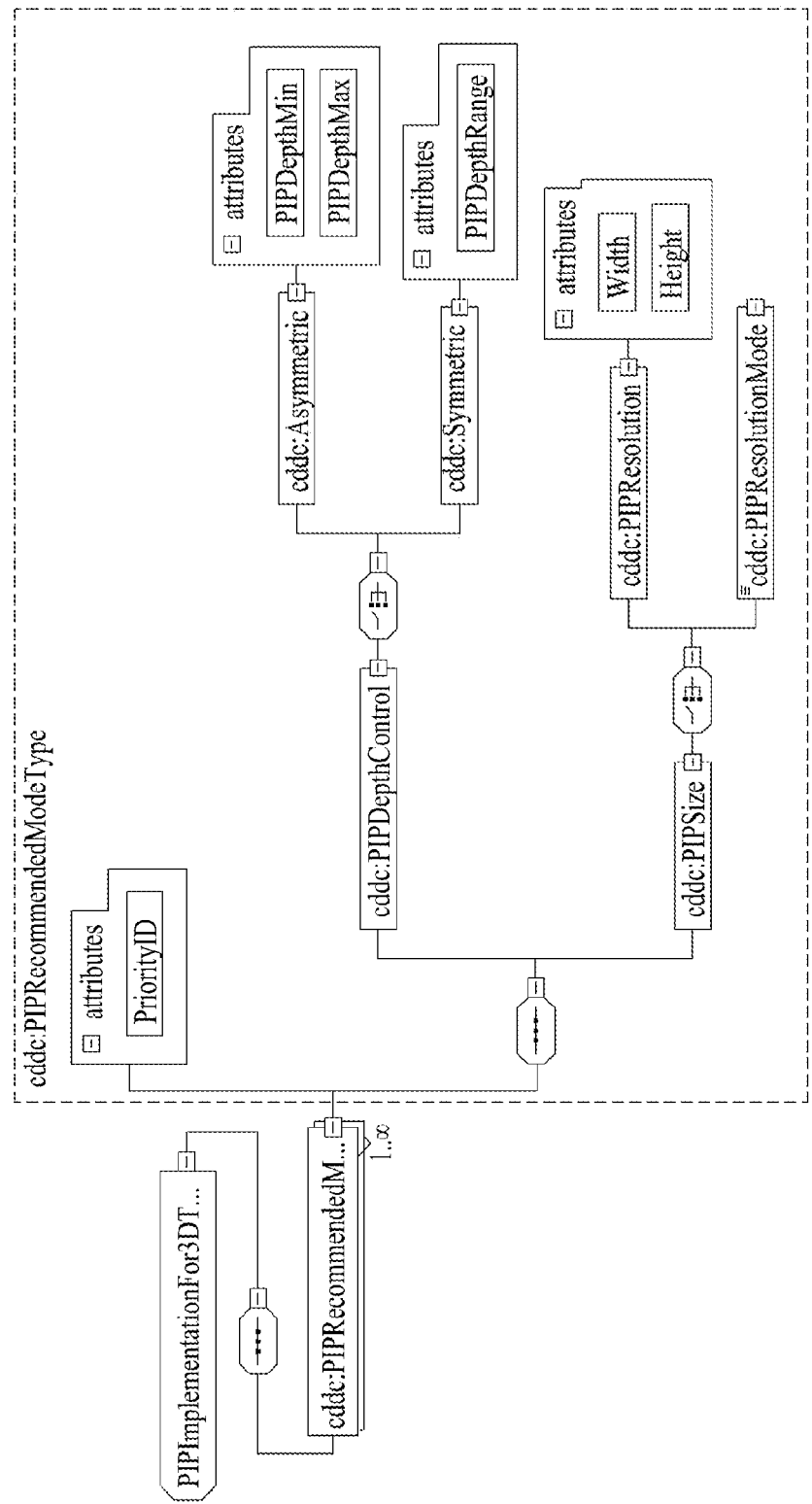
FIG. 37 is a view illustrating an example of a PIPImplementationFor3DType XML schema structure according to the present invention.
Figure 39:
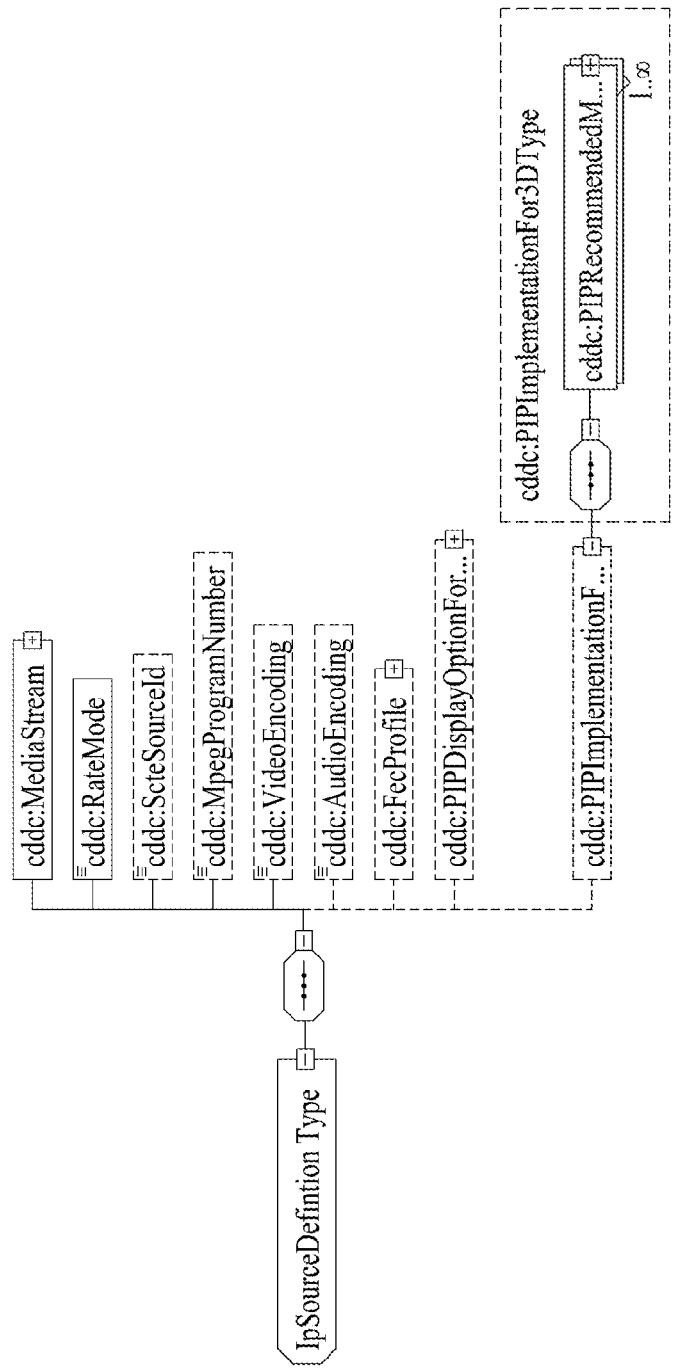
FIG. 39 is a view illustrating another example of an IpSourceDefinitionType XML schema structure according to the present invention.

FIG. 37 is a view illustrating an example of a PIPImplementationFor3DType XML schema structure according to the present invention, FIG. 38 is a view illustrating another example of a PIPImplementationFor3DType XML schema structure according to the present invention, and FIG. 39 is a view illustrating another example of an IpSourceDefinitionType XML schema structure according to the present invention.

FIGS. 37 and 38 provide information for 3D PIP realization. For example, FIGS. 37 and 38 may be an XML schema structure of FIG. 13. Consequently, a detailed description of definition and content of each sub element will be omitted.

Also, FIG. 39 illustrates a case in which the schema structure of FIGS. 37 and 38 is additionally included in the IpSourceDefinitionType of FIG. 35.

Figure 40:
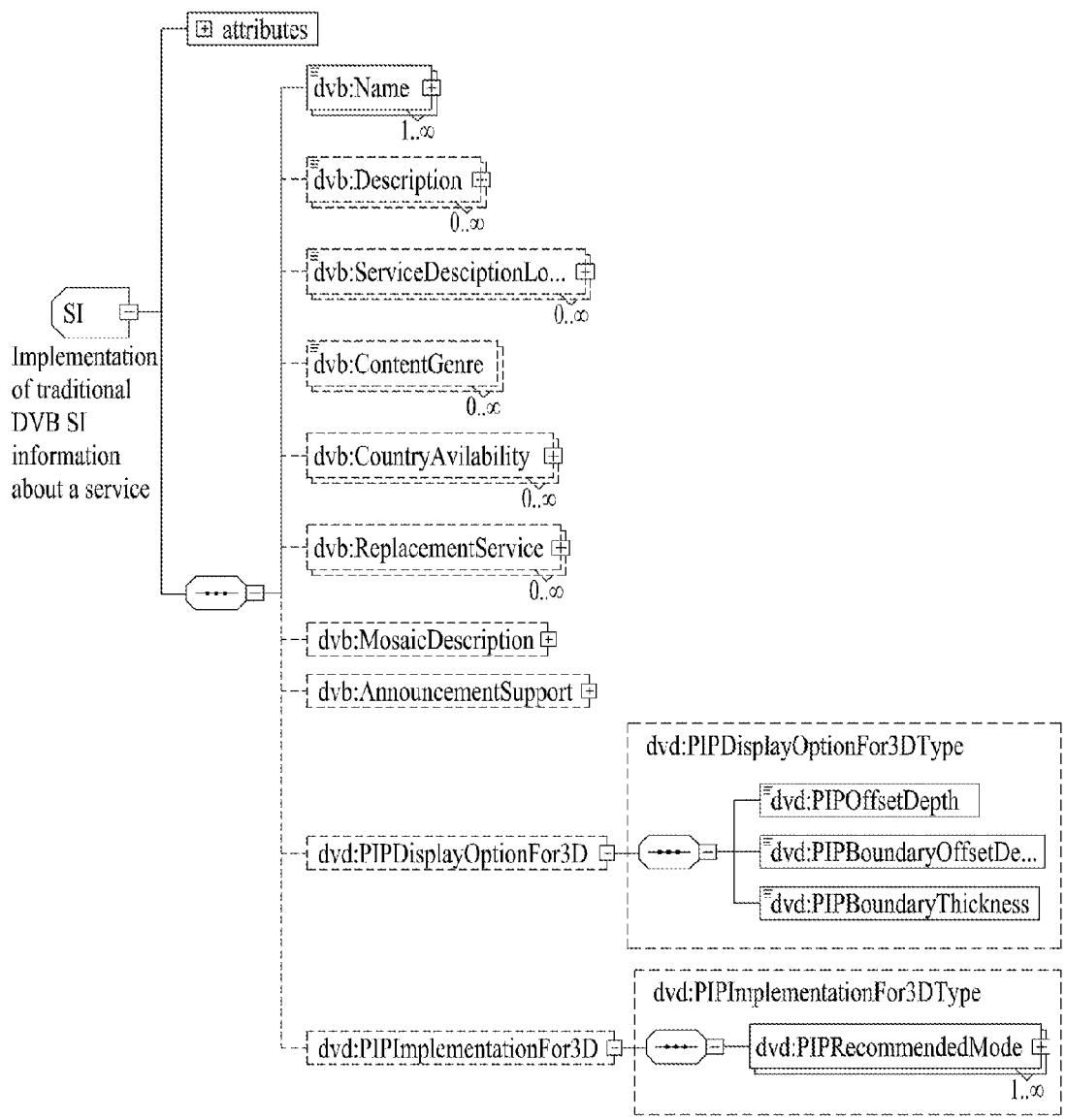
FIG. 40 is a view illustrating an example of an SI XML schema structure according to the present invention.

FIG. 40 is a view illustrating an example of an SI XML schema structure according to the present invention.

SI information may include attributes and service information of a service.

The SI information may include Name information, Description information, service description location information, content genre information, country availability information, replacement service information, mosaic description information, announcement support information, PIPDisplayOptionFor3D information, and IPImplementationFor3D information.

The Name information may indicate a service name known to a user in a text from.

The Description information may indicate a text description of a service.

The ServiceDescriptionLocation information may indicate an identifier of a BCG record for a BCG discovery element transmitting the provided information.

The ContentGenre information may indicate the (main) genre of a service.

The CountryAvailability information may indicate a list of countries in which a service is possible or impossible.

The ReplacementService information may indicate details regarding connection to another service in a case in which the provision of a service referred to by an SI record ends in failure.

The MosaicDescription information may indicate a service displayed in a mosaic stream and details regarding a service package.

The AnnouncementSupport information may indicate announcement supported by a service. Also, the AnnouncementSupport information may indicate linkage information regarding announcement location.

The PIPDisplayOptionFor3D and IPImplementationFor3D information are the same as the above, and therefore, a detailed description thereof will be omitted.

According to an embodiment of the present invention, in a DVB IPTV system, each IPTV service is expressed in Service Discovery and Selection (DVB SD&S) in unit of IPService. Among these, the SI element provides additional detailed information regarding a service. This information mostly equally provides the content included in an SDT on a DSV SI. In order to extend this, information related to 3D PIP display is additionally provided as will hereinafter be described.

Even in the DVB IPTV system, it is possible to configure DSV SI information in a TS in the form of an MPEG2 TS in the same manner as previously described and to transmit the DSV SI information through an IP network such that the DSV SI information is used in the same form as in an existing DVB broadcast.

Figure 41:
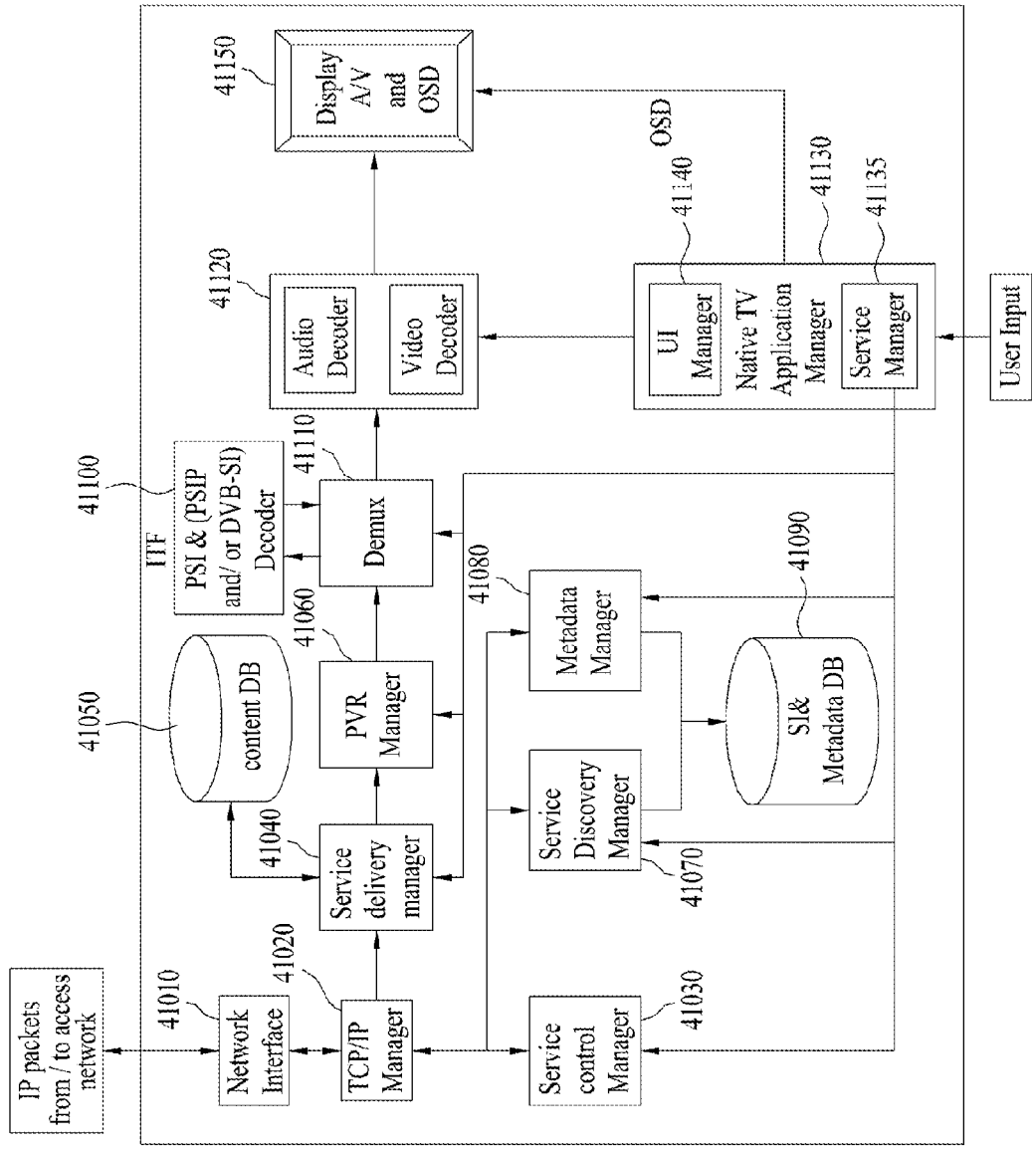
FIG. 41 is a view illustrating another example of a digital receiver to process a 3D service according to the present invention.

FIG. 41 is a view illustrating another example of a digital receiver to process a 3D service according to the present invention.

FIG. 41 is a view showing an IPTV receiver according to an embodiment of the present invention.

The IPTV receiver according to the embodiment of the present invention includes a Network Interface 41010, a TPC/IP Manager 41020, a Service Control Manager 41030, a Service Delivery Manager 41040, a Content DB 41050, a PVR manager 41060, a Service Discovery Manager 41070, a Metadata Manager 41080, an SI & Metadata DB 41090, a PSI & (PSIP and/or DVB-SI) decoder 41100, a Demultiplexer (DEMUX) 41110, an Audio and Video Decoder 41120, a Native TV Application manager 41130, and/or A/V and OSD Displayer 41140.

The Network Interface 41010 serves to transmit/receive an IPTV packet. The Network Interface 41010 is operated in a physical layer and/or a data link layer.

The TPC/IP Manager 41020 participates in transmission of an end to end packet. That is, the TPC/IP Manager 41020 serves to manage transmission of a packet from a source to a destination. The TPC/IP Manager 41020 serves to distribute and transmit IPTV packets to appropriate managers.

The Service Control Manager 41030 serves to select and control a service. The Service Control Manager 41030 may serve to manage a session. For example, the Service Control Manager 41030 may select a real time broadcast service using an Internet Group Management Protocol (IGMP) or an RTSP. For example, the Service Control Manager 41030 may select Video on Demand (VOD) content using the RTSP. For example, in a case in which an IP Multimedia Subsystem (IMS) is used, the Service Control Manager 41030 performs session initialization and/or management through an IMS gateway using a session initiation protocol (SIP). In order to control transmission through TV broadcasting or audio broadcasting as well as transmission on demand, the RTSP protocol is used. The RTSP protocol uses a continuous TCP connection and supports trick mode control for a real time media streaming.

The Service Delivery Manager 41040 participates in real time streaming and/or handling of content downloading. The Service Delivery Manager 41040 retrieves content from the Content DB 41050 for future use. The Service Delivery Manager 41040 may use a Real-Time Transport Protocol (RTP)/RTP Control Protocol (RTCP) together with an MPEG-2 Transport Stream (TS). In this case, an MPEG-2 packet is encapsulated using the RTP. The Service Delivery Manager 41040 parses an RTP packet and transmits the parsed packet to the Demultiplexer 41110. The Service Delivery Manager 41040 may serve to transmit a feedback of network reception using the RTCP. MPEG-2 transport packets may be directly transmitted using a user datagram protocol (UDP) without using the RTP. The Service Delivery Manager 41040 may use a hypertext transfer protocol (HTTP) or a File Delivery over Unidirectional Transport (FLUTE) as a transfer protocol for content downloading. The Service Delivery Manager 41040 may serve to process a stream transmitting 3D video composition information. That is, in a case in which the above 3D video composition information is transmitted by a stream, it may be processed by the Service Delivery Manager 41040.

The Content DB 41050 is a database for content transmitted by a content downloading system or content recorded from a live media TV.

The PVR manager 41060 serves to record and reproduce live streaming content. The PVR manager 41060 collects all metadata necessary for recorded content and additional information for better user environment. For example, a thumbnail image or an index may be included.

The Service Discovery Manager 41070 enables search of an IPTV service through a bi-directional IP network. The Service Discovery Manager 41070 provides all information regarding selectable services.

The Metadata Manager 41080 manages processing of metadata.

The SI & Metadata DB 41090 is linked to a metadata DB to manage metadata.

The PSI & (PSIP and/or DVB-SI) decoder 41100 is a PSI control module. A PSIP or a DVB-SI as well as the PSI may be included. In the following, the PSI is used as a concept including them. The PSI & (PSIP and/or DVB-SI) decoder 41100 sets PIDs for a PSI table and transmits the set PIDs to the Demultiplexer 41110. The PSI & (PSIP and/or DVB-SI) decoder 41100 decodes a PSI private section transmitted from the Demultiplexer 41110. The result sets an audio and video PID, which is used to demultiplex input TPs.

The Demultiplexer 41110 demultiplexes audio, video, and PSI tables from input transport packets (TPs). The Demultiplexer 41110 is controlled by the PSI & (PSIP and/or DVB-SI) decoder 41100 to demultiplex the PSI table. The Demultiplexer 41110 generates PSI table sections and outputs the generated PSI table sections to the PSI & (PSIP and/or DVB-SI) decoder 41100. Also, the Demultiplexer 41110 is controlled to demultiplex an A/V TP.

The Audio and Video Decoder 41120 may decode video and/or audio elementary stream packets. The Audio and Video Decoder 41120 includes an Audio Decoder and/or a Video Decoder. The Audio Decoder decodes audio elementary stream packets. The Video Decoder decodes video elementary stream packets.

The Native TV Application manager 41130 includes a UI Manager 41140 and/or a Service Manager 41135. The Native TV Application manager 41130 supports a Graphical User Interface on a TV screen. The Native TV Application manager 41130 may receive a user key from a remote controller or a front panel. The Native TV Application manager 41130 may manage the status of a TV system. The Native TV Application manager 41130 may serve to configure a 3D OSD and control output thereof.

The UI Manager 41140 may control a User Interface to be displayed on the TV screen.

The Service Manager 41135 serves to control managers related to a service. For example, the Service Manager 41135 may control the Service Control Manager 41030, the Service Delivery Manager 41040, an IG-OITF client, the Service Discovery Manager (41070), and/or the Metadata manager 41080. The Service Manager 41135 processes information related to 3D PIP display to control display of a 3D video image.

The A/V and OSD Displayer 41150 receives audio data and video data to control display of the video data and reproduction of the audio data. The A/V and OSD Displayer 41150 may perform video data processing, such as resizing through filtering, video formatting, and frame rate conversion, based on 3D PIP information. The A/V and OSD Displayer 41150 controls output of an OSD. In case of a 3D service, the A/V and OSD Displayer 41150 may serve as a 3D Output Formatter to receive left and right view images and output the received left and right view images as a Stereoscopic video. During this procedure, a 3D OSD may be output in combination with the video. Also, the A/V and OSD Displayer 41150 may serve as a PIP scaler for a 3D PIP service.

Figure 42:
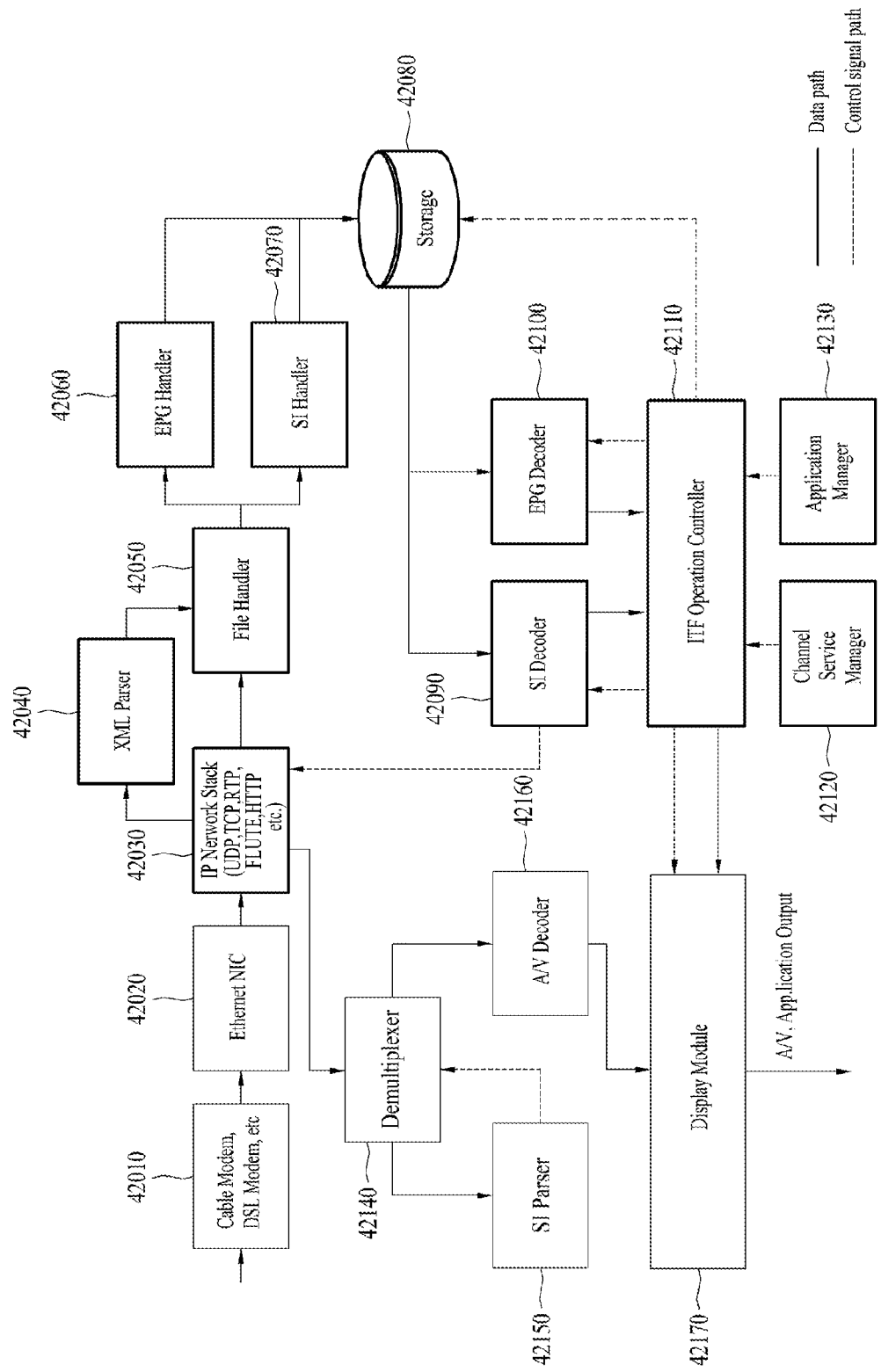
FIG. 42 is a view illustrating a further example of a digital receiver to process a 3D service according to the present invention.

FIG. 42 is a view illustrating a further example of a digital receiver to process a 3D service according to the present invention.

FIG. 42 is a view showing functional blocks of an IPTV receiver according to an embodiment of the present invention.

The functional blocks of the IPTV receiver according to the embodiment of the present invention may include a cable modem/DSL modem 42010, an Ethernet NIC 42020, an IP network stack 42030, an XML parser 42040, a file handler 42050, an EPG handler 42060, an SI handler 42070, a storage unit 42080, an SI decoder 42090, an EPG decoder 42100, an ITF operation controller 42110, a channel service manager 42120, an application manager 42130, a demultiplexer 42140, an SI parser 42150, an audio/video decoder 42160, and/or a display module 42170.

The blocks mainly handled in the present invention are indicated by bold lines. Solid arrows indicate Data paths, and dotted line arrows indicate Control signal paths. The details of the respective functional blocks are as follows.

The cable modem/DSL modem 42010 demodulates a signal transmitted through an interface or a physical medium for connection between an ITF and an IP Network in a physical layer to restore a digital signal.

The Ethernet NIC 42020 is a module to restore the signal transmitted through the physical interface into IP data.

The IP network stack 42030 is a processing module for each layer based on an IP protocol stack.

The XML parser 42040 is a module to parse an XML document, which is one of the received IP data.

The file handler 42050 is a module to handle data received in the form of a file through FULTE from among the received IP data.

The EPG handler 42060 is a module to handle a portion corresponding to the IPTV EPG data from among the received file type data and store the portion corresponding to the IPTV EPG data in the storage unit.

The SI handler 42070 is a module to handle a portion corresponding to the IPTV SI data from among the received file type data and store the portion corresponding to the IPTV SI data in the storage unit.

The storage unit 42080 is a storage unit to store data, such as SI and an EPG, which are necessary to be stored.

The SI decoder 42090 is a device that reads and analyzes SI data from the storage unit 42080 to restore necessary information if Channel Map information is necessary.

The EPG decoder 42100 is a device that reads and analyzes EPG data from the storage unit 42080 to restore necessary information if EPG information is necessary.

The ITF operation controller 42110 is a main control unit to control the operation of an ITF, such as channel change and EPG display.

The channel service manager 42120 is a module to receive user input and manage an operation, such as channel change.

The application manager 42130 is a module to receive user input and manage an application service, such as EPG display.

The demultiplexer 42140 is a mode to extract MPEG-2 transport stream data from a received IP datagram and transmit the extract MPEG-2 transport stream data to a corresponding module according to each PID.

The SI parser 42150 is a module to extract and parse PSI/PSIP data containing information for access to a program element, such as PID information of the respective data (audio/video) of the MPEG-2 transport stream in the received IP datagram.

The audio/video decoder 42160 is a module to decode the received audio and video data and transmit the decoded audio and video data to the display module.

The display module 42170 combines and processes the received AV signal and OSD signal and output the processed AV signal and OSD signal to a screen and a speaker. The display module 42170 may output a 3D PIP together with a 2D/3D base service according to information related to 3D PIP display. The display module 42170 may perform video data processing, such as resizing through filtering, video formatting, and frame rate conversion, based on 3D PIP information. Also, in case of a 3D video, the display module 42170 serves to perform separation between L and R view images and to output a 3D image through a formatter. Also, the display module 42170 may serve to process an OSD such that the OSD is displayed together with the 3D image using information related to a 3D depth.

MODE FOR INVENTION

Various embodiments have been described in the best mode for carrying out the invention.

According to the present invention, it is possible to support a service which is supported in a 2D environment even in a 3D environment, to signal, appropriately process, and provide a 3D PIP or preview service to a user, and to apply the 3D PIP or preview service to a content guide, thereby improving convenience in a 3D service and achieving easy use of the 3D service.

The method invention according to the present invention may be realized in the form of program commands that are executable by various computing means and written in computer readable media. The computer readable media may include program commands, data files, and data structures alone or in a combined state. The program commands recoded in the media may be particularly designed and configured for the present invention or well known to those skilled in the art related to computer software. Examples of the computer readable media may include magnetic media, such as a hard disk, a floppy disk, and a magnetic tape, optical media, such as a compact disc read only memory (CD-ROM) and a digital versatile disc (DVD), magneto-optical media, such as a floptical disk, and hardware devices, such as a read only memory (ROM), a random access memory (RAM), and a flash memory, which are particularly configured to store and execute program commands. Examples of the program commands may include high-level language codes executable by a computer using an interpreter as well as machine language codes generated by a complier. The hardware devices may be configured to function as one or more software modules to perform the operation of the present invention, or vice versa.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention relates to a method of processing 3D video content and a digital receiver. The present invention is widely usable in a digital and communication field. Consequently, the present invention has industrial applicability.

The invention claimed is:

1. A digital receiver that processes three-dimensional (3D) video data comprising:
   a receiving unit configured to receive a first broadcast signal comprising first service data and first signaling data for a first service through a first channel and to receive a second broadcast signal comprising second 3D service data related to the first service data and second signaling data for a second 3D service through a second channel,
      wherein both the first service and the second 3D service are 3D video services;
   a demultiplexer configured to demultiplex the first service and the second 3D service from the first broadcast signal and the second broadcast signal;
   a controller configured to acquire information regarding a channel to receive the second broadcast signal based on the demultiplexed first signaling data;
   a decoder configured to decode the second 3D service data;
   a formatter configured to format the decoded second 3D service data; and
   a display unit configured to output formatted first service data and the formatted second 3D service data to a display screen simultaneously,
      wherein the first signaling data includes linked service type information that indicates a type of the second 3D service is a 3D picture-in-picture (PIP) service,
      wherein the first signaling data includes connection information that identifies the second 3D service data linked with the first service data,
      wherein the second 3D service data is transmitted through a different channel from the first service data,
      wherein the second signaling data comprises boundary depth information indicating a distance of a depth plane at which an edge of the second 3D service is to be located to the display screen,
      wherein the second signaling data further comprises boundary thickness information indicating a thickness of an edge to be spaced at a boundary of the second 3D service.

2. The digital receiver according to claim 1, wherein the first signaling data includes video codec information for the 3D PIP service.

3. The digital receiver according to claim 2, wherein the first signaling data includes service type information identifying a type of the first service,
   wherein the first service is a 3D base service and the second 3D service is a 3D extended service decided according to the service type information.

4. The digital receiver according to claim 3, wherein the second signaling data comprises depth information regarding a distance of a depth plane at which the 3D extended service is to be located to the display screen.

5. The digital receiver according to claim 4, wherein the first signaling data comprises at least one of information regarding a size of the 3D extended service and information regarding depth symmetry of the 3D extended service to output the 3D extended service to the display screen,
   the information regarding the size of the 3D extended service comprises at least one of information regarding a height and a width of the 3D extended service and information regarding resolution of the 3D extended service, and
   the information regarding the depth symmetry of the 3D extended service comprises at least one of information regarding a depth rage of the 3D extended service and information regarding a minimum depth value and a maximum depth value of the 3D extended service.

6. A method of processing three-dimensional (3D) video data in a digital receiver, the method comprising:
   receiving a first broadcast signal comprising first service data and first signaling data for a first service through a first channel;
   receiving a second broadcast signal comprising second 3D service data related to the first service data and second signaling data for a second 3D service through a second channel,
      wherein both the first service and the second 3D service are 3D video service;
   acquiring information regarding a channel to receive the second broadcast signal based on the first signaling data;
   decoding the second 3D service data;
   outputting decoded first service data and the decoded second 3D service data to a displace screen simultaneously,
      wherein the first signaling data includes linked service type information that indicates a type of the second 3D service is a 3D picture in picture (PIP) service,
      wherein the first signaling data includes connection information that identifies the second 3D service data linked with the first service data,
      wherein the second 3D service data is transmitted through a different channel from the first service data,
      wherein the second signaling data comprises boundary depth information indicating a distance of a depth plane at which an edge of the second 3D service is to be located to the display screen,
      wherein the second signaling data further comprises boundary thickness information indicating a thickness of an edge to be spaced at a boundary of the second 3D service.

7. The method according to claim 6, wherein the first signaling data includes video codec information for the 3D PIP service.

8. The method according to claim 7, wherein the first signaling data includes service type information identifying a type of the first service,
   wherein the first service is a 3D base service, and the second 3D service is a 3D extended service decided according to the service type information.

9. The method according to claim 8, wherein the second signaling data comprises depth information regarding a distance of a depth plane at which the 3D extended service is to be located to the display screen.

10. The method according to claim 9, wherein
the first signaling data comprises at least one of information regarding a size of the 3D extended service and information regarding depth symmetry of the 3D extended service to output the 3D extended service to the display screen,
the information regarding the size of the 3D extended service comprises at least one of information regarding a height and a width of the 3D extended service and information regarding resolution of the 3D extended service, and
the information regarding the depth symmetry of the 3D extended service comprises at least one of information regarding a depth rage of the 3D extended service and information regarding a minimum depth value and a maximum depth value of the 3D extended service.

* * * * *